US010946736B2

(12) United States Patent
Fischer et al.

(10) Patent No.: US 10,946,736 B2
(45) Date of Patent: Mar. 16, 2021

(54) ALL-TERRAIN VEHICLE

(71) Applicant: Polaris Industries Inc., Medina, MN (US)

(72) Inventors: Burton D. Fischer, Badger, MN (US); William L. Barbrey, Lino Lakes, MN (US)

(73) Assignee: Polaris Industries Inc., Medina, MN (US)

( * ) Notice: Subject to any disclaimer, the term of this patent is extended or adjusted under 35 U.S.C. 154(b) by 125 days.

(21) Appl. No.: 16/000,395

(22) Filed: Jun. 5, 2018

(65) Prior Publication Data

US 2019/0367117 A1  Dec. 5, 2019

(51) Int. Cl.
| *B62K 5/01* | (2013.01) |
| *B60K 11/04* | (2006.01) |
| *B62D 21/18* | (2006.01) |
| *B60K 17/34* | (2006.01) |

(52) U.S. Cl.
CPC .............. *B60K 11/04* (2013.01); *B60K 17/34* (2013.01); *B62D 21/18* (2013.01); *B62K 5/01* (2013.01); *B60Y 2200/124* (2013.01)

(58) Field of Classification Search
CPC .................................................. B60K 11/04
See application file for complete search history.

(56) References Cited

U.S. PATENT DOCUMENTS

| 1,031,497 | A | 7/1912 | West |
| D119,377 | S | 3/1940 | Cadwallader |
| 2,468,809 | A | 5/1949 | Brock et al. |
| 2,553,795 | A | 5/1951 | Staude |
| 2,576,017 | A | 11/1951 | John et al. |
| 2,672,103 | A | 3/1954 | Hohmes |
| 2,757,017 | A | 7/1956 | Matthias et al. |
| 2,833,366 | A | 5/1958 | Olley |
| 3,048,233 | A | 8/1962 | Crain et al. |
| 3,193,302 | A | 7/1965 | Hill |
| 3,292,944 | A | 12/1966 | Dangauthier |
| 3,366,411 | A | 1/1968 | Vittone |
| 3,422,918 | A | 1/1969 | Musser et al. |
| 3,508,764 | A | 4/1970 | Dobson et al. |
| 3,560,022 | A | 2/1971 | Gold |
| 3,603,422 | A | 9/1971 | Cordiano |
| 3,712,416 | A | 1/1973 | Swanson et al. |
| 3,734,219 | A | 5/1973 | Christensen et al. |
| 3,791,482 | A | 2/1974 | Sykora |
| 3,800,910 | A | 4/1974 | Rose |

(Continued)

FOREIGN PATENT DOCUMENTS

| CA | 2903511 | 12/2016 |
| CH | 317335 | 11/1956 |

(Continued)

OTHER PUBLICATIONS

Office Action issued by the Canadian Intellectual Property Office, dated Jun. 2, 2020, for Canadian Patent Application No. 3,044,002; 6 pages.

(Continued)

*Primary Examiner* — Nicole T Verley
(74) *Attorney, Agent, or Firm* — Faegre Drinker Biddle & Reath LLP

(57) ABSTRACT

An ATV is shown having a radiator that is coupled to the frame forward of and a hood is rotatably coupled to the frame and having an open position providing access to the radiator and a closed position enclosing the radiator.

29 Claims, 33 Drawing Sheets

(56) References Cited

U.S. PATENT DOCUMENTS

| | | |
|---|---|---|
| 3,858,902 A | 1/1975 | Howells et al. |
| 3,861,229 A | 1/1975 | Domaas |
| D237,873 S | 12/1975 | Johnson |
| 3,966,014 A | 6/1976 | Gowing |
| 4,010,975 A | 3/1977 | Horton |
| 4,027,892 A | 6/1977 | Parks |
| 4,046,403 A | 9/1977 | Yoshida |
| 4,098,414 A | 7/1978 | Abiera |
| 4,109,751 A | 8/1978 | Kabele |
| 4,114,713 A | 9/1978 | Mery |
| 4,136,756 A | 1/1979 | Kawamura |
| 4,217,970 A | 8/1980 | Chika |
| 4,254,746 A | 3/1981 | Chiba et al. |
| 4,340,123 A | 7/1982 | Fujikawa |
| 4,344,718 A | 8/1982 | Taylor |
| 4,366,878 A | 1/1983 | Warf |
| 4,425,976 A | 1/1984 | Kimura |
| 4,434,755 A | 3/1984 | Kazuta et al. |
| 4,529,244 A | 7/1985 | Zaydel |
| 4,561,323 A | 12/1985 | Stromberg |
| 4,577,716 A | 3/1986 | Norton |
| 4,592,316 A | 6/1986 | Shiratsuchi et al. |
| 4,600,072 A | 7/1986 | Krude |
| 4,641,854 A | 2/1987 | Masuda et al. |
| 4,650,210 A | 3/1987 | Hirose et al. |
| 4,671,521 A | 6/1987 | Talbot et al. |
| 4,681,178 A | 7/1987 | Brown |
| 4,686,433 A | 8/1987 | Shimizu |
| 4,705,128 A | 11/1987 | Krude |
| 4,712,629 A | 12/1987 | Takahashi et al. |
| 4,722,548 A | 2/1988 | Hamilton et al. |
| 4,732,244 A | 3/1988 | Verkuylen |
| D297,132 S | 8/1988 | Ryuzoji et al. |
| 4,773,675 A | 9/1988 | Kosuge |
| 4,779,895 A | 10/1988 | Rubel |
| D298,811 S | 12/1988 | Morita |
| 4,817,985 A | 4/1989 | Enokimoto et al. |
| 4,821,825 A | 4/1989 | Somerton-Rayner |
| 4,826,205 A | 5/1989 | Kouda et al. |
| 4,827,416 A | 5/1989 | Kawagoe et al. |
| D301,849 S | 6/1989 | Oba et al. |
| 4,867,474 A | 9/1989 | Smith |
| D305,999 S | 2/1990 | Ueda et al. |
| 4,927,170 A | 5/1990 | Wada |
| 4,934,737 A | 6/1990 | Nakatsuka |
| 4,941,784 A | 7/1990 | Flament |
| D312,441 S | 11/1990 | Guelfi et al. |
| 4,969,661 A | 11/1990 | Omura et al. |
| 4,974,697 A | 12/1990 | Krude |
| 5,010,970 A | 4/1991 | Yamamoto |
| 5,015,009 A | 5/1991 | Ohyama et al. |
| 5,016,728 A | 5/1991 | Zulawski |
| 5,016,903 A | 5/1991 | Kijima et al. |
| 5,020,616 A | 6/1991 | Yagi et al. |
| 5,021,721 A | 6/1991 | Oshita et al. |
| 5,024,460 A | 6/1991 | Hanson et al. |
| 5,027,915 A | 7/1991 | Suzuki et al. |
| 5,036,939 A | 8/1991 | Johnson et al. |
| 5,038,582 A | 8/1991 | Takamatsu |
| 5,044,614 A | 9/1991 | Rau |
| 5,048,860 A | 9/1991 | Kanai et al. |
| 5,062,654 A | 11/1991 | Kakimoto et al. |
| 5,062,657 A | 11/1991 | Majeed |
| 5,074,374 A | 12/1991 | Ohtake et al. |
| 5,076,383 A | 12/1991 | Inoue et al. |
| 5,078,225 A | 1/1992 | Ohmura et al. |
| 5,080,392 A | 1/1992 | Bazergui |
| D327,237 S | 6/1992 | Miyamoto et al. |
| 5,163,538 A | 11/1992 | Derr et al. |
| 5,181,696 A | 1/1993 | Abe |
| 5,189,615 A | 2/1993 | Rubel et al. |
| 5,195,607 A | 3/1993 | Shimada et al. |
| 5,203,585 A | 4/1993 | Pierce |
| 5,205,371 A | 4/1993 | Karnopp |
| 5,251,713 A | 10/1993 | Enokimoto |
| 5,251,718 A | 10/1993 | Inagawa et al. |
| 5,253,730 A | 10/1993 | Hayashi et al. |
| 5,327,989 A | 7/1994 | Furuhashi et al. |
| 5,342,023 A | 8/1994 | Kuriki et al. |
| D354,264 S | 1/1995 | McCoy |
| 5,390,121 A | 2/1995 | Wolfe |
| 5,473,990 A | 12/1995 | Anderson et al. |
| 5,475,596 A | 12/1995 | Henry et al. |
| 5,483,448 A | 1/1996 | Liubakka et al. |
| 5,507,510 A | 4/1996 | Kami et al. |
| D373,099 S | 8/1996 | Molzon et al. |
| 5,549,428 A | 8/1996 | Yeatts |
| 5,550,739 A | 8/1996 | Hoffmann et al. |
| D374,416 S | 10/1996 | Miyamoto et al. |
| 5,562,066 A | 10/1996 | Gere et al. |
| 5,653,304 A | 8/1997 | Renfroe |
| D383,095 S | 9/1997 | Miyamoto et al. |
| 5,676,292 A | 10/1997 | Miller |
| 5,678,847 A | 10/1997 | Izawa et al. |
| 5,697,633 A | 12/1997 | Lee |
| D391,911 S | 3/1998 | Lagaay et al. |
| 5,738,471 A | 4/1998 | Zentner et al. |
| 5,752,791 A | 5/1998 | Ehrlich |
| 5,776,568 A | 7/1998 | Andress et al. |
| 5,816,650 A | 10/1998 | Lucas, Jr. |
| 5,819,702 A | 10/1998 | Mendler |
| 5,820,114 A | 10/1998 | Tsai |
| 5,820,150 A | 10/1998 | Archer et al. |
| 5,863,277 A | 1/1999 | Melbourne |
| D405,029 S | 2/1999 | Deutschman |
| 5,887,671 A | 3/1999 | Yuki et al. |
| 5,895,063 A | 4/1999 | Hasshi et al. |
| 5,921,343 A | 7/1999 | Yamakaji |
| 5,950,750 A | 9/1999 | Dong et al. |
| 5,957,252 A | 9/1999 | Berthold |
| D414,735 S | 10/1999 | Gerisch et al. |
| 5,961,106 A | 10/1999 | Shaffer |
| 5,961,135 A | 10/1999 | Smock |
| 6,000,702 A | 12/1999 | Streiter |
| D421,934 S | 3/2000 | Hunter et al. |
| D421,935 S | 3/2000 | Fujieda |
| 6,032,752 A | 3/2000 | Karpik et al. |
| 6,056,077 A | 5/2000 | Kobayashi |
| 6,067,078 A | 5/2000 | Hartman |
| 6,070,681 A | 6/2000 | Catanzarite et al. |
| 6,070,689 A | 6/2000 | Tanaka et al. |
| 6,078,252 A | 6/2000 | Kulczycki et al. |
| D428,363 S | 7/2000 | Sugimoto et al. |
| 6,092,877 A | 7/2000 | Rasidescu et al. |
| D429,663 S | 8/2000 | Tamashima et al. |
| 6,095,275 A | 8/2000 | Shaw |
| 6,098,739 A | 8/2000 | Anderson et al. |
| 6,112,866 A | 9/2000 | Boichot et al. |
| 6,113,328 A | 9/2000 | Claucherty |
| 6,120,399 A | 9/2000 | Okeson et al. |
| 6,142,123 A | 11/2000 | Galasso et al. |
| 6,149,540 A | 11/2000 | Johnson et al. |
| 6,152,253 A | 11/2000 | Monaghan |
| D436,557 S | 1/2001 | Selby et al. |
| D436,559 S | 1/2001 | Fujieda |
| 6,176,796 B1 | 1/2001 | Lislegard |
| 6,186,547 B1 | 2/2001 | Skabrond et al. |
| 6,196,634 B1 | 3/2001 | Jurinek |
| 6,199,894 B1 | 3/2001 | Anderson |
| 6,202,993 B1 | 3/2001 | Wilms et al. |
| 6,216,809 B1 | 4/2001 | Etou et al. |
| 6,224,046 B1 | 5/2001 | Miyamoto |
| 6,247,442 B1 | 6/2001 | Bedard et al. |
| 6,249,728 B1 | 6/2001 | Streiter |
| 6,293,617 B1 | 9/2001 | Sukegawa |
| 6,352,142 B1 | 3/2002 | Kim |
| 6,370,458 B1 | 4/2002 | Shal et al. |
| 6,412,585 B1 | 7/2002 | Deanda |
| D461,151 S | 8/2002 | Morris |
| 6,467,787 B1 | 10/2002 | Marsh |
| D467,200 S | 12/2002 | Luo et al. |
| 6,507,778 B2 | 1/2003 | Koh |
| 6,523,627 B2 | 2/2003 | Fukuda |
| 6,523,634 B1 | 2/2003 | Gagnon et al. |

(56) References Cited

U.S. PATENT DOCUMENTS

| | | | |
|---|---|---|---|
| RE38,012 E | 3/2003 | Ochab et al. |
| D472,193 S | 3/2003 | Sinkwitz |
| 6,530,730 B2 | 3/2003 | Swensen |
| 6,547,224 B2 | 4/2003 | Jensen et al. |
| 6,553,761 B2 | 4/2003 | Beck |
| 6,581,716 B1 | 6/2003 | Matsuura |
| 6,582,002 B2 | 6/2003 | Hogan et al. |
| 6,582,004 B1 | 6/2003 | Hamm |
| D476,935 S | 7/2003 | Boyer |
| 6,588,536 B1 | 7/2003 | Chiu |
| 6,604,034 B1 | 8/2003 | Speck et al. |
| 6,622,806 B1 | 9/2003 | Matsuura |
| 6,622,968 B1 | 9/2003 | St et al. |
| 6,626,256 B2 | 9/2003 | Dennison et al. |
| 6,626,260 B2 | 9/2003 | Gagnon et al. |
| D480,991 S | 10/2003 | Rondeau et al. |
| 6,648,569 B2 | 11/2003 | Douglass et al. |
| 6,651,768 B2 | 11/2003 | Fournier et al. |
| 6,655,717 B1 | 12/2003 | Wang |
| 6,685,174 B2 | 2/2004 | Behmenburg et al. |
| 6,695,566 B2 | 2/2004 | Rodriguez Navio |
| 6,722,463 B1 | 4/2004 | Reese |
| 6,725,962 B1 | 4/2004 | Fukuda |
| D490,018 S | 5/2004 | Berg et al. |
| 6,732,830 B2 | 5/2004 | Gagnon et al. |
| 6,745,862 B2 | 6/2004 | Morii et al. |
| 6,752,235 B1 | 6/2004 | Bell et al. |
| 6,752,401 B2 | 6/2004 | Burdock |
| D492,916 S | 7/2004 | Rondeau et al. |
| 6,767,022 B1 | 7/2004 | Chevalier |
| D493,749 S | 8/2004 | Duncan |
| D493,750 S | 8/2004 | Crepeau et al. |
| D494,890 S | 8/2004 | Katoh |
| 6,772,824 B1 * | 8/2004 | Tsuruta ................ B60K 11/02 123/41.49 |
| D496,308 S | 9/2004 | Wu |
| 6,786,526 B1 | 9/2004 | Blalock |
| D497,324 S | 10/2004 | Chestnut et al. |
| D497,327 S | 10/2004 | Lai |
| 6,799,779 B2 | 10/2004 | Shibayama |
| 6,799,781 B2 | 10/2004 | Rasidescu et al. |
| D498,435 S | 11/2004 | Saito et al. |
| 6,820,708 B2 | 11/2004 | Nakamura |
| 6,827,184 B1 | 12/2004 | Lin |
| 6,834,736 B2 | 12/2004 | Kramer et al. |
| D501,570 S | 2/2005 | Tandrup et al. |
| 6,851,679 B2 | 2/2005 | Downey et al. |
| 6,857,498 B2 | 2/2005 | Vitale et al. |
| 6,860,826 B1 | 3/2005 | Johnson |
| 6,868,932 B1 | 3/2005 | Davis et al. |
| D503,657 S | 4/2005 | Katoh |
| D503,658 S | 4/2005 | Lu |
| D503,905 S | 4/2005 | Saito et al. |
| D504,638 S | 5/2005 | Tanaka et al. |
| 6,892,842 B2 * | 5/2005 | Bouffard ................ B60K 11/04 180/68.3 |
| 6,895,318 B1 | 5/2005 | Barton et al. |
| D507,766 S | 7/2005 | McMahan et al. |
| 6,916,142 B2 | 7/2005 | Hansen et al. |
| D508,224 S | 8/2005 | Mays et al. |
| 6,923,507 B1 | 8/2005 | Billberg et al. |
| 6,938,508 B1 | 9/2005 | Saagge |
| 6,942,050 B1 | 9/2005 | Honkala et al. |
| 6,945,541 B2 | 9/2005 | Brown |
| RE38,895 E | 11/2005 | McLemore |
| D511,317 S | 11/2005 | Tanaka et al. |
| D511,717 S | 11/2005 | Lin |
| 6,966,399 B2 | 11/2005 | Tanigaki et al. |
| 6,976,720 B1 | 12/2005 | Bequette |
| 6,978,857 B2 | 12/2005 | Korenjak |
| D513,718 S | 1/2006 | Itaya et al. |
| 6,988,759 B2 | 1/2006 | Fin et al. |
| 7,000,931 B1 | 2/2006 | Chevalier |
| 7,004,137 B2 | 2/2006 | Kunugi et al. |
| D516,467 S | 3/2006 | Wu |
| D517,951 S | 3/2006 | Luh |
| D517,952 S | 3/2006 | Luh |
| 7,011,174 B1 | 3/2006 | James |
| 7,014,241 B2 | 3/2006 | Toyota et al. |
| D518,759 S | 4/2006 | Kettler et al. |
| D519,439 S | 4/2006 | Dahl et al. |
| 7,032,895 B2 | 4/2006 | Folchert |
| 7,035,836 B2 | 4/2006 | Caponetto et al. |
| D520,912 S | 5/2006 | Knight et al. |
| D520,914 S | 5/2006 | Luh |
| D521,413 S | 5/2006 | Katoh |
| 7,040,437 B1 | 5/2006 | Fredrickson et al. |
| D522,924 S | 6/2006 | Yokoyama et al. |
| D523,782 S | 6/2006 | Lin |
| 7,055,454 B1 | 6/2006 | Whiting et al. |
| 7,076,351 B2 | 7/2006 | Hamilton et al. |
| 7,077,233 B2 | 7/2006 | Hasegawa |
| 7,080,704 B1 | 7/2006 | Kerner |
| 7,096,988 B2 | 8/2006 | Moriyama |
| 7,097,166 B2 | 8/2006 | Folchert |
| D529,414 S | 10/2006 | Wu et al. |
| D531,088 S | 10/2006 | Lin |
| 7,124,853 B1 | 10/2006 | Kole, Jr. |
| 7,125,134 B1 | 10/2006 | Hedlund et al. |
| D532,339 S | 11/2006 | Hishiki |
| 7,136,729 B2 | 11/2006 | Salman et al. |
| 7,137,764 B2 | 11/2006 | Johnson |
| 7,140,619 B2 | 11/2006 | Hrovat et al. |
| 7,143,861 B2 | 12/2006 | Chu |
| 7,147,075 B2 | 12/2006 | Tanaka et al. |
| D535,215 S | 1/2007 | Turner et al. |
| 7,159,557 B2 | 1/2007 | Yasuda et al. |
| 7,168,516 B2 | 1/2007 | Nozaki et al. |
| 7,168,709 B2 | 1/2007 | Niwa et al. |
| 7,172,232 B2 | 2/2007 | Chiku et al. |
| 7,182,169 B2 | 2/2007 | Suzuki |
| 7,185,732 B2 | 3/2007 | Saito et al. |
| D539,705 S | 4/2007 | Ichikawa et al. |
| D542,186 S | 5/2007 | Lai et al. |
| D542,188 S | 5/2007 | Miwa et al. |
| 7,213,669 B2 | 5/2007 | Fecteau et al. |
| 7,216,733 B2 | 5/2007 | Iwami et al. |
| 7,234,707 B2 | 6/2007 | Green et al. |
| D546,246 S | 7/2007 | Crepeau et al. |
| 7,237,789 B1 | 7/2007 | Herman |
| 7,239,032 B1 | 7/2007 | Wilson et al. |
| D548,662 S | 8/2007 | Markefka |
| D549,133 S | 8/2007 | Lepage |
| 7,258,355 B2 | 8/2007 | Amano |
| 7,270,335 B2 | 9/2007 | Hio et al. |
| 7,275,512 B2 | 10/2007 | Deiss et al. |
| 7,281,753 B2 | 10/2007 | Curtis et al. |
| 7,286,919 B2 | 10/2007 | Nordgren et al. |
| 7,287,619 B2 | 10/2007 | Tanaka et al. |
| D555,036 S | 11/2007 | Eck |
| D561,064 S | 2/2008 | Crepeau |
| D562,189 S | 2/2008 | Miwa et al. |
| D563,274 S | 3/2008 | Ramos et al. |
| 7,347,296 B2 | 3/2008 | Nakamura et al. |
| 7,357,207 B2 | 4/2008 | Vaeisaenen Esa |
| 7,357,211 B2 | 4/2008 | Inui |
| 7,359,787 B2 | 4/2008 | Ono et al. |
| 7,367,247 B2 | 5/2008 | Horiuchi et al. |
| 7,367,417 B2 | 5/2008 | Inui et al. |
| 7,370,724 B2 | 5/2008 | Saito et al. |
| 7,374,012 B2 | 5/2008 | Inui et al. |
| 7,377,351 B2 | 5/2008 | Smith et al. |
| 7,380,622 B2 | 6/2008 | Shimizu |
| 7,380,805 B1 | 6/2008 | Turner |
| 7,386,378 B2 | 6/2008 | Lauwerys et al. |
| 7,387,180 B2 | 6/2008 | Konno et al. |
| 7,401,794 B2 | 7/2008 | Laurent et al. |
| 7,401,797 B2 | 7/2008 | Cho |
| 7,407,190 B2 | 8/2008 | Berg et al. |
| 7,416,234 B2 | 8/2008 | Bequette |
| 7,421,954 B2 | 9/2008 | Bose |
| 7,427,072 B2 | 9/2008 | Brown |
| D578,433 S | 10/2008 | Kawaguchi et al. |
| D578,934 S | 10/2008 | Tanaka et al. |

(56) References Cited

U.S. PATENT DOCUMENTS

| | | |
|---|---|---|
| 7,431,024 B2 | 10/2008 | Buchwitz et al. |
| 7,438,147 B2 | 10/2008 | Kato et al. |
| 7,441,789 B2 | 10/2008 | Geiger et al. |
| 7,458,593 B2 | 12/2008 | Saito et al. |
| D584,661 S | 1/2009 | Tanaka et al. |
| 7,481,293 B2 | 1/2009 | Ogawa et al. |
| 7,483,775 B2 | 1/2009 | Karaba et al. |
| D585,792 S | 2/2009 | Chao et al. |
| D586,694 S | 2/2009 | Huang et al. |
| 7,490,694 B1 | 2/2009 | Berg et al. |
| 7,497,299 B2 | 3/2009 | Kobayashi |
| 7,497,471 B2 | 3/2009 | Kobayashi |
| 7,497,472 B2 | 3/2009 | Cymbal et al. |
| 7,510,060 B2 | 3/2009 | Izawa et al. |
| D592,556 S | 5/2009 | Mehra |
| D592,557 S | 5/2009 | Mehra |
| D592,998 S | 5/2009 | Woodard et al. |
| D593,454 S | 6/2009 | Sanschagrin et al. |
| D595,188 S | 6/2009 | Tandrup |
| 7,540,511 B2 | 6/2009 | Saito et al. |
| D595,613 S | 7/2009 | Lai et al. |
| D596,080 S | 7/2009 | Lai et al. |
| 7,565,944 B2 | 7/2009 | Sakamoto et al. |
| 7,565,945 B2 | 7/2009 | Okada et al. |
| D597,890 S | 8/2009 | Lai et al. |
| 7,571,039 B2 | 8/2009 | Chen et al. |
| 7,575,088 B2 | 8/2009 | Mir et al. |
| D599,250 S | 9/2009 | Hirano |
| D599,251 S | 9/2009 | Yin et al. |
| 7,588,010 B2 | 9/2009 | Mochizuki et al. |
| 7,591,472 B2 | 9/2009 | Kinjyo et al. |
| 7,597,385 B2 | 10/2009 | Shibata et al. |
| 7,600,603 B2 | 10/2009 | Okada et al. |
| 7,600,762 B2 | 10/2009 | Yasui et al. |
| 7,600,769 B2 | 10/2009 | Bessho et al. |
| 7,604,084 B2 | 10/2009 | Okada et al. |
| 7,610,132 B2 | 10/2009 | Yanai et al. |
| D604,201 S | 11/2009 | Kawaguchi et al. |
| 7,611,154 B2 | 11/2009 | Delaney |
| 7,623,327 B2 | 11/2009 | Ogawa |
| D605,555 S | 12/2009 | Tanaka et al. |
| D606,900 S | 12/2009 | Flores |
| D606,905 S | 12/2009 | Yao |
| 7,630,807 B2 | 12/2009 | Yoshimura et al. |
| D607,377 S | 1/2010 | Shimomura et al. |
| 7,641,208 B1 | 1/2010 | Barron et al. |
| 7,644,791 B2 | 1/2010 | Davis et al. |
| 7,644,934 B2 | 1/2010 | Mizuta |
| D609,136 S | 2/2010 | Renchuan |
| D610,514 S | 2/2010 | Eck |
| 7,677,646 B2 | 3/2010 | Nakamura |
| 7,682,115 B1 | 3/2010 | Jay et al. |
| 7,684,911 B2 | 3/2010 | Seifert et al. |
| 7,694,769 B2 | 4/2010 | McGuire |
| 7,703,826 B1 | 4/2010 | German |
| 7,708,103 B2 | 5/2010 | Okuyama et al. |
| 7,708,106 B1 | 5/2010 | Bergman et al. |
| 7,717,495 B2 | 5/2010 | Leonard et al. |
| 7,728,212 B2 | 6/2010 | Fujishima et al. |
| 7,740,103 B2 | 6/2010 | Sasajima |
| 7,740,256 B2 | 6/2010 | Davis |
| 7,742,851 B2 | 6/2010 | Hisada et al. |
| D620,399 S | 7/2010 | Wu et al. |
| 7,751,959 B2 | 7/2010 | Boon et al. |
| D621,423 S | 8/2010 | Nakanishi et al. |
| D622,631 S | 8/2010 | Lai et al. |
| 7,778,741 B2 | 8/2010 | Rao et al. |
| 7,786,886 B2 | 8/2010 | Maruyama et al. |
| 7,788,212 B2 | 8/2010 | Beckmann et al. |
| 7,795,602 B2 | 9/2010 | Leonard et al. |
| D625,662 S | 10/2010 | Li |
| 7,810,818 B2 | 10/2010 | Bushko |
| 7,819,220 B2 | 10/2010 | Sunsdahl et al. |
| D628,520 S | 12/2010 | Lin |
| 7,857,334 B2 | 12/2010 | Seki |
| D631,395 S | 1/2011 | Tandrup et al. |
| 7,862,061 B2 | 1/2011 | Jung |
| D633,006 S | 2/2011 | Sanschagrin et al. |
| 7,885,750 B2 | 2/2011 | Lu |
| 7,891,684 B1 | 2/2011 | Luttinen et al. |
| 7,899,594 B2 | 3/2011 | Messih et al. |
| 7,912,610 B2 | 3/2011 | Saito et al. |
| 7,913,505 B2 | 3/2011 | Nakamura |
| 7,913,782 B1 | 3/2011 | Foss et al. |
| D636,704 S | 4/2011 | Yoo et al. |
| 7,926,822 B2 | 4/2011 | Ohletz et al. |
| D638,755 S | 5/2011 | Bracy et al. |
| 7,942,427 B2 | 5/2011 | Lloyd |
| 7,950,486 B2 | 5/2011 | Van et al. |
| D640,171 S | 6/2011 | Danisi |
| D640,598 S | 6/2011 | Zhang |
| D640,604 S | 6/2011 | Lai et al. |
| D640,605 S | 6/2011 | Lai et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,970,512 B2 | 6/2011 | Lu et al. |
| D641,288 S | 7/2011 | Sun |
| 7,984,915 B2 | 7/2011 | Post et al. |
| D642,493 S | 8/2011 | Goebert et al. |
| D643,781 S | 8/2011 | Nagao et al. |
| 8,005,596 B2 | 8/2011 | Lu et al. |
| 8,027,775 B2 | 9/2011 | Takenaka et al. |
| 8,032,281 B2 | 10/2011 | Bujak et al. |
| 8,037,959 B2 * | 10/2011 | Yamamura ............ B62D 25/084 180/68.4 |
| 8,047,324 B2 | 11/2011 | Yao et al. |
| 8,050,818 B2 | 11/2011 | Mizuta |
| 8,050,857 B2 | 11/2011 | Lu et al. |
| 8,052,202 B2 | 11/2011 | Nakamura |
| 8,056,392 B2 | 11/2011 | Ryan et al. |
| 8,056,912 B2 | 11/2011 | Kawabe et al. |
| 8,065,054 B2 | 11/2011 | Tarasinski et al. |
| D650,311 S | 12/2011 | Bracy |
| 8,075,002 B1 | 12/2011 | Pionke et al. |
| 8,086,371 B2 | 12/2011 | Furuichi et al. |
| 8,087,676 B2 | 1/2012 | McIntyre |
| 8,095,268 B2 | 1/2012 | Parison et al. |
| 8,100,434 B2 | 1/2012 | Miura |
| 8,104,524 B2 | 1/2012 | Manesh et al. |
| 8,108,104 B2 | 1/2012 | Hrovat et al. |
| 8,116,938 B2 | 2/2012 | Itagaki et al. |
| 8,121,757 B2 | 2/2012 | Song et al. |
| D657,720 S | 4/2012 | Eck et al. |
| D657,721 S | 4/2012 | Miyanishi |
| 8,152,880 B2 | 4/2012 | Matschl et al. |
| D660,746 S | 5/2012 | Bracy |
| 8,167,067 B2 * | 5/2012 | Peterson ................ F01N 3/055 180/68.2 |
| 8,167,325 B2 | 5/2012 | Lee et al. |
| 8,170,749 B2 | 5/2012 | Mizuta |
| 8,176,957 B2 | 5/2012 | Manesh et al. |
| 8,205,701 B2 * | 6/2012 | Kuramoto .............. B62D 25/10 180/291 |
| 8,205,910 B2 | 6/2012 | Leonard et al. |
| 8,209,087 B2 | 6/2012 | Haegglund et al. |
| D662,855 S | 7/2012 | Wang |
| 8,214,106 B2 | 7/2012 | Ghoneim et al. |
| 8,219,262 B2 | 7/2012 | Stiller |
| 8,229,642 B2 | 7/2012 | Post et al. |
| D665,309 S | 8/2012 | Lepine et al. |
| D665,705 S | 8/2012 | Lepine et al. |
| 8,260,496 B2 | 9/2012 | Gagliano |
| 8,271,175 B2 | 9/2012 | Takenaka et al. |
| D668,184 S | 10/2012 | Tashiro |
| 8,296,010 B2 | 10/2012 | Hirao et al. |
| D671,037 S | 11/2012 | Wu et al. |
| 8,308,170 B2 | 11/2012 | Van et al. |
| 8,315,764 B2 | 11/2012 | Chen et al. |
| 8,321,088 B2 | 11/2012 | Brown et al. |
| 8,322,497 B2 | 12/2012 | Marjoram et al. |
| 8,328,235 B2 | 12/2012 | Schneider et al. |
| D674,728 S | 1/2013 | Matsumura |
| 8,352,143 B2 | 1/2013 | Lu et al. |

(56) References Cited

U.S. PATENT DOCUMENTS

| | | |
|---|---|---|
| 8,355,840 B2 | 1/2013 | Ammon et al. |
| 8,374,748 B2 | 2/2013 | Jolly |
| 8,376,373 B2 | 2/2013 | Conradie |
| 8,376,441 B2 | 2/2013 | Nakamura et al. |
| 8,396,627 B2 | 3/2013 | Jung et al. |
| D680,468 S | 4/2013 | Li et al. |
| D680,469 S | 4/2013 | Li et al. |
| 8,417,417 B2 | 4/2013 | Chen et al. |
| 8,424,832 B2 | 4/2013 | Robbins et al. |
| 8,434,774 B2 | 5/2013 | Leclerc et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,517,136 B2 | 8/2013 | Hurd et al. |
| 8,517,395 B2 | 8/2013 | Knox et al. |
| 8,522,911 B2 | 9/2013 | Hurd et al. |
| 8,538,628 B2 | 9/2013 | Backman |
| D691,519 S | 10/2013 | Fisher |
| D691,924 S | 10/2013 | Smith |
| 8,548,678 B2 | 10/2013 | Ummethala et al. |
| 8,550,221 B2 | 10/2013 | Paulides et al. |
| 8,556,015 B2 | 10/2013 | Itoo et al. |
| 8,573,605 B2 | 11/2013 | Di Maria |
| D694,671 S | 12/2013 | Lai et al. |
| 8,596,398 B2 | 12/2013 | Bennett |
| 8,596,405 B2 | 12/2013 | Sunsdahl et al. |
| 8,613,335 B2 | 12/2013 | Deckard et al. |
| 8,613,336 B2 | 12/2013 | Deckard et al. |
| 8,613,337 B2 | 12/2013 | Kinsman et al. |
| 8,626,388 B2 | 1/2014 | Oikawa |
| 8,626,389 B2 | 1/2014 | Sidlosky |
| 8,640,814 B2 | 2/2014 | Deckard et al. |
| 8,641,052 B2 | 2/2014 | Kondo et al. |
| 8,645,024 B2 | 2/2014 | Daniels |
| 8,651,557 B2 | 2/2014 | Suzuki |
| 8,657,050 B2 | 2/2014 | Yamaguchi |
| D701,143 S | 3/2014 | Shan |
| D701,469 S | 3/2014 | Lai et al. |
| 8,672,106 B2 | 3/2014 | Laird et al. |
| 8,672,337 B2 | 3/2014 | Van et al. |
| D703,102 S | 4/2014 | Eck et al. |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,731,774 B2 | 5/2014 | Yang |
| 8,746,719 B2 | 6/2014 | Safranski et al. |
| D712,311 S | 9/2014 | Morgan et al. |
| 8,827,019 B2 | 9/2014 | Deckard et al. |
| 8,827,020 B2 | 9/2014 | Deckard et al. |
| 8,827,028 B2 | 9/2014 | Sunsdahl et al. |
| D719,061 S | 12/2014 | Tandrup et al. |
| D721,300 S | 1/2015 | Li et al. |
| 8,944,449 B2 | 2/2015 | Hurd et al. |
| 8,960,347 B2 | 2/2015 | Bennett |
| 8,973,693 B2 * | 3/2015 | Kinsman .................. B60R 21/13 |
| | | 180/89.1 |
| 8,997,908 B2 * | 4/2015 | Kinsman ............... B62D 21/183 |
| | | 180/89.1 |
| 9,016,760 B2 | 4/2015 | Kuroda et al. |
| 9,022,160 B2 * | 5/2015 | Smith ..................... B60K 26/02 |
| | | 180/273 |
| 9,027,937 B2 | 5/2015 | Ryan et al. |
| 9,061,711 B2 | 6/2015 | Kuroda et al. |
| D734,689 S | 7/2015 | Hashimoto |
| D735,615 S | 8/2015 | Itaya et al. |
| 9,211,924 B2 | 12/2015 | Safranski et al. |
| 9,217,501 B2 | 12/2015 | Deckard et al. |
| D751,467 S | 3/2016 | Lai et al. |
| 9,327,587 B2 * | 5/2016 | Spindler ............... B62D 23/005 |
| 9,365,251 B2 | 6/2016 | Safranski et al. |
| D761,698 S | 7/2016 | Umemoto |
| D763,732 S | 8/2016 | Okuyama et al. |
| D764,973 S | 8/2016 | Mikhailov et al. |
| 9,428,031 B2 | 8/2016 | Kuwabara et al. |
| 9,440,671 B2 * | 9/2016 | Schlangen ............... B60G 3/20 |
| 9,469,329 B1 | 10/2016 | Leanza |
| D774,955 S | 12/2016 | Lai et al. |
| D774,957 S | 12/2016 | Umemoto |
| 9,566,858 B2 | 2/2017 | Hicke et al. |
| 9,592,713 B2 | 3/2017 | Kinsman et al. |
| 9,623,912 B2 * | 4/2017 | Schlangen ............... B60N 2/012 |
| D787,985 S | 5/2017 | Wilcox et al. |
| 9,649,928 B2 | 5/2017 | Danielson |
| 9,713,976 B2 | 7/2017 | Miller et al. |
| 9,725,023 B2 | 8/2017 | Miller et al. |
| 9,776,481 B2 * | 10/2017 | Deckard ............... B62D 21/183 |
| 9,944,177 B2 | 4/2018 | Fischer |
| 10,017,090 B2 | 7/2018 | Franker et al. |
| D832,149 S | 10/2018 | Wilcox et al. |
| 10,124,709 B2 | 11/2018 | Bohnsack et al. |
| 10,160,497 B2 * | 12/2018 | Wimpfheimer .......... B60G 3/20 |
| 10,183,605 B2 | 1/2019 | Weber et al. |
| 10,246,153 B2 * | 4/2019 | Deckard .................. B60N 2/90 |
| 10,300,786 B2 | 5/2019 | Nugteren et al. |
| 10,359,011 B2 | 7/2019 | Dewit et al. |
| 10,369,861 B2 | 8/2019 | Deckard et al. |
| 10,399,401 B2 * | 9/2019 | Schlangen ............ B60G 13/003 |
| 10,486,748 B2 * | 11/2019 | Deckard ............... B62D 23/005 |
| 2001/0005803 A1 | 6/2001 | Cochofel et al. |
| 2001/0007396 A1 | 7/2001 | Mizuta |
| 2001/0013433 A1 | 8/2001 | Szymkowiak |
| 2001/0021887 A1 | 9/2001 | Obradovich et al. |
| 2001/0031185 A1 | 10/2001 | Swensen |
| 2001/0035642 A1 | 11/2001 | Gotz et al. |
| 2002/0023792 A1 | 2/2002 | Bouffard et al. |
| 2002/0063440 A1 | 5/2002 | Spurr et al. |
| 2002/0074760 A1 | 6/2002 | Eshelman |
| 2002/0082752 A1 | 6/2002 | Obradovich |
| 2002/0147072 A1 | 10/2002 | Goodell et al. |
| 2002/0178968 A1 | 12/2002 | Christensen |
| 2003/0001409 A1 | 1/2003 | Semple et al. |
| 2003/0125857 A1 | 7/2003 | Madau et al. |
| 2003/0132075 A1 | 7/2003 | Drivers |
| 2003/0137121 A1 | 7/2003 | Lenz et al. |
| 2003/0168267 A1 | 9/2003 | Borroni-Bird et al. |
| 2003/0173754 A1 | 9/2003 | Bryant |
| 2003/0200016 A1 | 10/2003 | Spillane et al. |
| 2003/0205867 A1 | 11/2003 | Coelingh et al. |
| 2003/0213628 A1 | 11/2003 | Rioux et al. |
| 2004/0010383 A1 | 1/2004 | Lu et al. |
| 2004/0041358 A1 | 3/2004 | Hrovat et al. |
| 2004/0079561 A1 | 4/2004 | Ozawa et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0108159 A1 | 6/2004 | Rondeau et al. |
| 2004/0124028 A1 * | 7/2004 | Lachapelle ............. B60K 11/04 |
| | | 180/291 |
| 2004/0153782 A1 | 8/2004 | Fukui et al. |
| 2004/0169347 A1 | 9/2004 | Seki |
| 2004/0195018 A1 | 10/2004 | Inui et al. |
| 2004/0195019 A1 | 10/2004 | Kato et al. |
| 2004/0195034 A1 | 10/2004 | Kato et al. |
| 2004/0195797 A1 | 10/2004 | Nash et al. |
| 2004/0206567 A1 | 10/2004 | Kato et al. |
| 2004/0206568 A1 | 10/2004 | Davis et al. |
| 2004/0207190 A1 | 10/2004 | Nakagawa et al. |
| 2004/0221669 A1 | 11/2004 | Shimizu et al. |
| 2004/0226384 A1 | 11/2004 | Shimizu et al. |
| 2004/0231900 A1 | 11/2004 | Tanaka et al. |
| 2005/0006168 A1 | 1/2005 | Iwasaka et al. |
| 2005/0012421 A1 | 1/2005 | Fukuda et al. |
| 2005/0045414 A1 | 3/2005 | Takagi et al. |
| 2005/0056472 A1 | 3/2005 | Smith et al. |
| 2005/0077098 A1 | 4/2005 | Takayanagi et al. |
| 2005/0098964 A1 | 5/2005 | Brown |
| 2005/0131604 A1 | 6/2005 | Lu |
| 2005/0173177 A1 | 8/2005 | Smith et al. |
| 2005/0173180 A1 | 8/2005 | Hypes et al. |
| 2005/0206111 A1 | 9/2005 | Gibson et al. |

(56) References Cited

U.S. PATENT DOCUMENTS

| | | |
|---|---|---|
| 2005/0231145 A1 | 10/2005 | Mukai et al. |
| 2005/0235767 A1 | 10/2005 | Shimizu et al. |
| 2005/0235768 A1 | 10/2005 | Shimizu et al. |
| 2005/0242677 A1 | 11/2005 | Akutsu et al. |
| 2005/0246052 A1 | 11/2005 | Coleman et al. |
| 2005/0248116 A1 | 11/2005 | Fanson |
| 2005/0257989 A1 | 11/2005 | Iwami et al. |
| 2005/0257990 A1 | 11/2005 | Shimizu |
| 2005/0267660 A1 | 12/2005 | Fujiwara et al. |
| 2005/0269141 A1 | 12/2005 | Davis et al. |
| 2005/0279244 A1 | 12/2005 | Bose |
| 2005/0279330 A1 | 12/2005 | Okazaki et al. |
| 2005/0280219 A1 | 12/2005 | Brown |
| 2006/0000458 A1 | 1/2006 | Dees et al. |
| 2006/0006010 A1 | 1/2006 | Nakamura et al. |
| 2006/0006696 A1 | 1/2006 | Umemoto et al. |
| 2006/0017240 A1 | 1/2006 | Laurent et al. |
| 2006/0022619 A1 | 2/2006 | Koike et al. |
| 2006/0032690 A1 | 2/2006 | Inomoto et al. |
| 2006/0032700 A1 | 2/2006 | Vizanko |
| 2006/0042862 A1 | 3/2006 | Saito et al. |
| 2006/0055139 A1 | 3/2006 | Furumi et al. |
| 2006/0065472 A1 | 3/2006 | Ogawa et al. |
| 2006/0071441 A1 | 4/2006 | Mathis |
| 2006/0075840 A1 | 4/2006 | Saito et al. |
| 2006/0076180 A1 | 4/2006 | Saito et al. |
| 2006/0108174 A1 | 5/2006 | Saito et al. |
| 2006/0131088 A1 | 6/2006 | Pawusch et al. |
| 2006/0162990 A1 | 7/2006 | Saito et al. |
| 2006/0169525 A1 | 8/2006 | Saito et al. |
| 2006/0175124 A1 | 8/2006 | Saito et al. |
| 2006/0180383 A1 | 8/2006 | Bataille et al. |
| 2006/0180385 A1 | 8/2006 | Yanai et al. |
| 2006/0185741 A1 | 8/2006 | McKee |
| 2006/0185927 A1 | 8/2006 | Sakamoto et al. |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito et al. |
| 2006/0196722 A1 | 9/2006 | Makabe et al. |
| 2006/0201270 A1 | 9/2006 | Kobayashi |
| 2006/0207823 A1 | 9/2006 | Okada et al. |
| 2006/0207824 A1 | 9/2006 | Saito et al. |
| 2006/0207825 A1 | 9/2006 | Okada et al. |
| 2006/0208564 A1 | 9/2006 | Yuda et al. |
| 2006/0212200 A1 | 9/2006 | Yanai et al. |
| 2006/0219452 A1 | 10/2006 | Okada et al. |
| 2006/0219463 A1 | 10/2006 | Seki et al. |
| 2006/0219469 A1 | 10/2006 | Okada et al. |
| 2006/0219470 A1 | 10/2006 | Imagawa et al. |
| 2006/0220330 A1 | 10/2006 | Urquidi et al. |
| 2006/0220341 A1 | 10/2006 | Seki et al. |
| 2006/0236980 A1 | 10/2006 | Maruo et al. |
| 2006/0270503 A1 | 11/2006 | Suzuki et al. |
| 2006/0278197 A1 | 12/2006 | Takamatsu et al. |
| 2006/0288800 A1 | 12/2006 | Mukai et al. |
| 2007/0000715 A1 | 1/2007 | Denney |
| 2007/0013181 A1 | 1/2007 | Heck |
| 2007/0018419 A1 | 1/2007 | Kinouchi et al. |
| 2007/0023221 A1 | 2/2007 | Okuyama et al. |
| 2007/0023566 A1 | 2/2007 | Howard |
| 2007/0068726 A1 | 3/2007 | Shimizu |
| 2007/0073461 A1 | 3/2007 | Fielder |
| 2007/0074588 A1 | 4/2007 | Harata et al. |
| 2007/0074589 A1 | 4/2007 | Harata et al. |
| 2007/0074927 A1 | 4/2007 | Okada et al. |
| 2007/0074928 A1 | 4/2007 | Okada et al. |
| 2007/0095601 A1 | 5/2007 | Okada et al. |
| 2007/0096449 A1 | 5/2007 | Okada et al. |
| 2007/0119650 A1 | 5/2007 | Eide |
| 2007/0120332 A1 | 5/2007 | Bushko et al. |
| 2007/0158920 A1 | 7/2007 | Delaney |
| 2007/0175696 A1 | 8/2007 | Saito et al. |
| 2007/0214818 A1 | 9/2007 | Nakamura |
| 2007/0215404 A1 | 9/2007 | Lan et al. |
| 2007/0221430 A1 | 9/2007 | Allison, Sr. |
| 2007/0227793 A1 | 10/2007 | Nozaki et al. |
| 2007/0242398 A1 | 10/2007 | Ogawa |
| 2007/0255466 A1 | 11/2007 | Chiao |
| 2007/0256882 A1 | 11/2007 | Bedard et al. |
| 2007/0261904 A1 | 11/2007 | Fecteau et al. |
| 2008/0023240 A1 | 1/2008 | Sunsdahl et al. |
| 2008/0023249 A1 | 1/2008 | Sunsdahl et al. |
| 2008/0041335 A1 | 2/2008 | Buchwitz et al. |
| 2008/0053738 A1 | 3/2008 | Kosuge et al. |
| 2008/0053743 A1 | 3/2008 | Tomita |
| 2008/0059034 A1 | 3/2008 | Lu |
| 2008/0084091 A1 | 4/2008 | Nakamura et al. |
| 2008/0093883 A1 | 4/2008 | Shibata et al. |
| 2008/0143505 A1 | 6/2008 | Maruyama et al. |
| 2008/0172155 A1 | 7/2008 | Takamatsu et al. |
| 2008/0183353 A1 | 7/2008 | Post et al. |
| 2008/0199253 A1 | 8/2008 | Okada et al. |
| 2008/0243336 A1 | 10/2008 | Fitzgibbons |
| 2008/0256738 A1 | 10/2008 | Malone |
| 2008/0257630 A1 | 10/2008 | Takeshima et al. |
| 2008/0275606 A1 | 11/2008 | Tarasinski et al. |
| 2008/0283326 A1 | 11/2008 | Bennett et al. |
| 2008/0284124 A1 | 11/2008 | Brady et al. |
| 2008/0308334 A1 | 12/2008 | Leonard et al. |
| 2009/0000849 A1 | 1/2009 | Leonard et al. |
| 2009/0001748 A1 | 1/2009 | Brown et al. |
| 2009/0014977 A1 | 1/2009 | Molenaar |
| 2009/0037051 A1 | 2/2009 | Shimizu et al. |
| 2009/0065285 A1 | 3/2009 | Maeda et al. |
| 2009/0071737 A1 | 3/2009 | Leonard et al. |
| 2009/0071739 A1 | 3/2009 | Leonard et al. |
| 2009/0078491 A1 | 3/2009 | Tsutsumikoshi et al. |
| 2009/0090575 A1 | 4/2009 | Nagasaka |
| 2009/0091101 A1 | 4/2009 | Leonard et al. |
| 2009/0093928 A1 | 4/2009 | Getman et al. |
| 2009/0108546 A1 | 4/2009 | Ohletz et al. |
| 2009/0108617 A1 | 4/2009 | Songwe, Jr. |
| 2009/0121518 A1 | 5/2009 | Leonard et al. |
| 2009/0152035 A1 | 6/2009 | Okada et al. |
| 2009/0152036 A1 | 6/2009 | Okada et al. |
| 2009/0178871 A1 | 7/2009 | Sunsdahl et al. |
| 2009/0189373 A1 | 7/2009 | Schramm et al. |
| 2009/0205891 A1 | 8/2009 | Parrett et al. |
| 2009/0240427 A1 | 9/2009 | Siereveld et al. |
| 2009/0261542 A1 | 10/2009 | McIntyre |
| 2009/0301830 A1 | 12/2009 | Kinsman et al. |
| 2009/0302590 A1 | 12/2009 | Van et al. |
| 2010/0017059 A1 | 1/2010 | Lu et al. |
| 2010/0057297 A1 | 3/2010 | Itagaki et al. |
| 2010/0078256 A1 | 4/2010 | Kuwabara et al. |
| 2010/0090797 A1 | 4/2010 | Koenig et al. |
| 2010/0121529 A1 | 5/2010 | Savaresi et al. |
| 2010/0152969 A1 | 6/2010 | Li et al. |
| 2010/0155170 A1 | 6/2010 | Melvin et al. |
| 2010/0187032 A1 | 7/2010 | Yamamura et al. |
| 2010/0187033 A1 | 7/2010 | Hayashi et al. |
| 2010/0194086 A1 | 8/2010 | Yamamura et al. |
| 2010/0194087 A1 | 8/2010 | Yamamura et al. |
| 2010/0211261 A1 | 8/2010 | Sasaki et al. |
| 2010/0230876 A1 | 9/2010 | Inoue et al. |
| 2010/0252972 A1 | 10/2010 | Cox et al. |
| 2010/0253018 A1 | 10/2010 | Peterson |
| 2010/0301571 A1 | 12/2010 | Van et al. |
| 2010/0314184 A1 | 12/2010 | Stenberg et al. |
| 2010/0317484 A1 | 12/2010 | Gillingham et al. |
| 2010/0317485 A1 | 12/2010 | Gillingham et al. |
| 2011/0035089 A1 | 2/2011 | Hirao et al. |
| 2011/0035105 A1 | 2/2011 | Jolly |
| 2011/0062748 A1 | 3/2011 | Kaita et al. |
| 2011/0074123 A1 | 3/2011 | Fought et al. |
| 2011/0094813 A1 | 4/2011 | Suzuki et al. |
| 2011/0094816 A1 | 4/2011 | Suzuki et al. |
| 2011/0094818 A1 | 4/2011 | Suzuki et al. |
| 2011/0153158 A1 | 6/2011 | Acocella |
| 2011/0155087 A1 | 6/2011 | Wenger et al. |
| 2011/0209937 A1 | 9/2011 | Belzile et al. |
| 2011/0240250 A1 | 10/2011 | Azuma |

(56) References Cited

U.S. PATENT DOCUMENTS

| | | |
|---|---|---|
| 2011/0298189 A1 | 12/2011 | Schneider et al. |
| 2012/0029770 A1 | 2/2012 | Hirao et al. |
| 2012/0031693 A1 | 2/2012 | Deckard et al. |
| 2012/0031694 A1 | 2/2012 | Deckard et al. |
| 2012/0053790 A1 | 3/2012 | Oikawa |
| 2012/0053791 A1 | 3/2012 | Harada |
| 2012/0073527 A1 | 3/2012 | Oltmans et al. |
| 2012/0073537 A1 | 3/2012 | Oltmans et al. |
| 2012/0078470 A1 | 3/2012 | Hirao et al. |
| 2012/0085588 A1 | 4/2012 | Kinsman et al. |
| 2012/0119454 A1 | 5/2012 | Di Maria |
| 2012/0161468 A1 | 6/2012 | Tsumiyama et al. |
| 2012/0168268 A1 | 7/2012 | Bruno et al. |
| 2012/0193163 A1 | 8/2012 | Wimpfheimer et al. |
| 2012/0212013 A1 | 8/2012 | Ripley et al. |
| 2012/0217078 A1* | 8/2012 | Kinsman ............ B60R 21/13 180/69.4 |
| 2012/0223500 A1 | 9/2012 | Kinsman et al. |
| 2012/0247888 A1 | 10/2012 | Chikuma et al. |
| 2012/0265402 A1 | 10/2012 | Post et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0033070 A1* | 2/2013 | Kinsman ............ B62D 21/183 296/190.03 |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0087396 A1 | 4/2013 | Itoo et al. |
| 2013/0103259 A1 | 4/2013 | Eng et al. |
| 2013/0158799 A1 | 6/2013 | Kamimura |
| 2013/0161921 A1 | 6/2013 | Cheng et al. |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0261893 A1 | 10/2013 | Yang |
| 2013/0304319 A1 | 11/2013 | Daniels |
| 2013/0319785 A1 | 12/2013 | Spindler et al. |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0008136 A1 | 1/2014 | Bennett |
| 2014/0012467 A1 | 1/2014 | Knox et al. |
| 2014/0034409 A1 | 2/2014 | Nakamura et al. |
| 2014/0046539 A1 | 2/2014 | Wijffels et al. |
| 2014/0058606 A1 | 2/2014 | Hilton |
| 2014/0060954 A1 | 3/2014 | Smith et al. |
| 2014/0062048 A1 | 3/2014 | Schlangen et al. |
| 2014/0065936 A1 | 3/2014 | Smith et al. |
| 2014/0067215 A1 | 3/2014 | Wetterlund et al. |
| 2014/0095022 A1 | 4/2014 | Cashman et al. |
| 2014/0102819 A1 | 4/2014 | Deckard et al. |
| 2014/0102820 A1 | 4/2014 | Deckard et al. |
| 2014/0109627 A1 | 4/2014 | Lee et al. |
| 2014/0125018 A1 | 5/2014 | Brady et al. |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0203533 A1 | 7/2014 | Safranski et al. |
| 2014/0217774 A1 | 8/2014 | Peterson et al. |
| 2014/0262584 A1 | 9/2014 | Lovold et al. |
| 2014/0353956 A1 | 12/2014 | Bjerketvedt et al. |
| 2014/0358373 A1 | 12/2014 | Kikuchi et al. |
| 2014/0360794 A1 | 12/2014 | Tallman |
| 2015/0002404 A1 | 1/2015 | Hooton |
| 2015/0029018 A1 | 1/2015 | Bowden et al. |
| 2015/0039199 A1 | 2/2015 | Kikuchi |
| 2015/0047917 A1 | 2/2015 | Burt et al. |
| 2015/0057885 A1 | 2/2015 | Brady et al. |
| 2015/0061275 A1 | 3/2015 | Deckard et al. |
| 2015/0210137 A1 | 7/2015 | Kinsman et al. |
| 2016/0059660 A1 | 3/2016 | Brady et al. |
| 2016/0061314 A1 | 3/2016 | Kuhl et al. |
| 2016/0108866 A1 | 4/2016 | Dewit et al. |
| 2016/0176283 A1 | 6/2016 | Hicke et al. |
| 2016/0176284 A1 | 6/2016 | Nugteren et al. |
| 2017/0106747 A1 | 4/2017 | Safranski et al. |
| 2017/0120946 A1 | 5/2017 | Gong et al. |
| 2017/0131095 A1 | 5/2017 | Kim |
| 2017/0199094 A1 | 7/2017 | Duff et al. |
| 2018/0065465 A1* | 3/2018 | Ward ............ B60K 5/10 |
| 2018/0178677 A1* | 6/2018 | Swain ............ B60N 2/01 |
| 2019/0143871 A1 | 5/2019 | Weber et al. |
| 2019/0185077 A1* | 6/2019 | Smith ............ B62D 47/003 |
| 2019/0193553 A1* | 6/2019 | Uno ............ B60K 11/08 |
| 2020/0070709 A1 | 3/2020 | Weber et al. |

FOREIGN PATENT DOCUMENTS

| | | |
|---|---|---|
| CN | 2255379 Y | 6/1997 |
| CN | 2544987 Y | 4/2003 |
| CN | 1660615 A | 8/2005 |
| CN | 1746803 A | 3/2006 |
| CN | 1749048 A | 3/2006 |
| CN | 1810530 A | 8/2006 |
| CN | 101511664 A | 8/2009 |
| CN | 101549626 A | 10/2009 |
| CN | 201723635 U | 1/2011 |
| CN | 102069813 A | 5/2011 |
| CN | 102168732 A | 8/2011 |
| CN | 201914049 U | 8/2011 |
| CN | 202040257 U | 11/2011 |
| CN | 102616104 A | 8/2012 |
| CN | 102627063 A | 8/2012 |
| CN | 102678808 A | 9/2012 |
| CN | 102729760 A | 10/2012 |
| CN | 202468817 U | 10/2012 |
| CN | 102840265 A | 12/2012 |
| CN | 202986930 U | 6/2013 |
| DE | 0037435 | 10/1886 |
| DE | 0116605 | 2/1900 |
| DE | 1755101 | 4/1971 |
| DE | 2210070 | 9/1973 |
| DE | 3033707 | 4/1982 |
| DE | 4129643 A1 | 3/1993 |
| DE | 19508302 A1 | 9/1996 |
| DE | 19949787 A1 | 4/2000 |
| DE | 19922745 A1 | 12/2000 |
| DE | 102010020544 A1 | 1/2011 |
| EP | 0237085 | 9/1987 |
| EP | 0238077 A2 | 9/1987 |
| EP | 0398804 A1 | 11/1990 |
| EP | 0403803 A1 | 12/1990 |
| EP | 0544108 A1 | 6/1993 |
| EP | 0546295 A1 | 6/1993 |
| EP | 0405123 | 10/1993 |
| EP | 0568251 A1 | 11/1993 |
| EP | 0575962 A1 | 12/1993 |
| EP | 0473766 | 2/1994 |
| EP | 0691226 A1 | 1/1996 |
| EP | 0709247 A2 | 5/1996 |
| EP | 0794096 A2 | 9/1997 |
| EP | 0893618 A2 | 1/1999 |
| EP | 1013310 A1 | 6/2000 |
| EP | 1172239 A2 | 1/2002 |
| EP | 1215107 A1 | 6/2002 |
| EP | 1219475 A1 | 7/2002 |
| EP | 1449688 A2 | 8/2004 |
| EP | 1493624 A1 | 1/2005 |
| EP | 1164897 | 2/2005 |
| EP | 1557345 A2 | 7/2005 |
| EP | 1564123 A2 | 8/2005 |
| EP | 2057060 A2 | 5/2009 |

(56) References Cited

FOREIGN PATENT DOCUMENTS

| | | |
|---|---|---|
| EP | 2123933 A2 | 11/2009 |
| EP | 2236395 A1 | 10/2010 |
| EP | 2517904 A1 | 10/2012 |
| FR | 2460797 A1 | 1/1981 |
| FR | 2914597 A1 | 10/2008 |
| FR | 2935642 | 3/2010 |
| FR | 2936028 A1 | 3/2010 |
| GB | 2036659 A | 7/1980 |
| GB | 2081191 A | 2/1982 |
| GB | 2316923 A | 3/1998 |
| GB | 2347398 A | 9/2000 |
| GB | 2423066 A | 8/2006 |
| JP | 60-067206 | 4/1985 |
| JP | 60-067268 A | 4/1985 |
| JP | 60-067269 A | 4/1985 |
| JP | 02-155815 A | 6/1990 |
| JP | 04-368211 A | 12/1992 |
| JP | 05-149443 A | 6/1993 |
| JP | 05-178055 A | 7/1993 |
| JP | 06-156036 A | 6/1994 |
| JP | 06-325977 A | 11/1994 |
| JP | 07-040783 | 2/1995 |
| JP | 07-117433 | 5/1995 |
| JP | 2898949 B2 | 6/1999 |
| JP | 11-334447 A | 12/1999 |
| JP | 2000-177434 A | 6/2000 |
| JP | 2001-018623 A | 1/2001 |
| JP | 3137209 B2 | 2/2001 |
| JP | 2001-121939 A | 5/2001 |
| JP | 2001-130304 A | 5/2001 |
| JP | 2002-219921 A | 8/2002 |
| JP | 2003-237530 A | 8/2003 |
| JP | 2004-308453 A | 11/2004 |
| JP | 2005-193788 A | 7/2005 |
| JP | 2006-232058 A | 9/2006 |
| JP | 2006-232061 A | 9/2006 |
| JP | 2006-256579 A | 9/2006 |
| JP | 2006-256580 A | 9/2006 |
| JP | 2006-281839 A | 10/2006 |
| JP | 2007-106319 A | 4/2007 |
| JP | 2009-035220 A | 2/2009 |
| JP | 2009-160964 A | 7/2009 |
| JP | 2010-095106 A | 4/2010 |
| JP | 2011-126405 A | 6/2011 |
| JP | 2013244808 A * | 12/2013 |
| WO | 92/10693 A1 | 6/1992 |
| WO | 98/30430 A1 | 7/1998 |
| WO | 00/53057 A1 | 9/2000 |
| WO | 2007/103197 A2 | 9/2007 |
| WO | 2008/005131 A2 | 1/2008 |
| WO | 2008/013564 A1 | 1/2008 |
| WO | 2008/016377 A2 | 2/2008 |
| WO | 2008/115459 A1 | 9/2008 |
| WO | 2009/096998 A1 | 8/2009 |
| WO | 2010/074990 A2 | 7/2010 |
| WO | 2010/148014 A1 | 12/2010 |
| WO | 2012/040553 A2 | 3/2012 |
| WO | 2012/109546 A1 | 8/2012 |
| WO | 2012/174793 A1 | 12/2012 |
| WO | 2013/166310 A1 | 11/2013 |
| WO | 2014/039432 A2 | 3/2014 |
| WO | 2014/039433 A2 | 3/2014 |
| WO | 2014/059258 A1 | 4/2014 |
| WO | 2014/143953 A2 | 9/2014 |
| WO | 2014/193975 A1 | 12/2014 |
| WO | 2016/186942 A1 | 11/2016 |

OTHER PUBLICATIONS

International Preliminary Report on Patentability received for PCT Patent Application No. PCT/US2016/031992, dated Nov. 30, 2017, 15 pages.
Honda Service Manual'89 FL400R Pilot, Honda Motor Co., Ltd., Nov. 1988, 265 pages, Exhibit 1014, *Arctic Cat, Inc.* v. *Polaris Industries, Inc.*, United States Patent and Trademark Office before the Patent Trial and Appeal Board, Case IPR2015-01788 and Case IPR2015-01789.
2009 Honda Big Red, ATV Illustrated at http://www.atvillustrated.com/?q=node/6615/20/2008, 6 pages.
2016 Mudpro 700 Limited, Arctic Cat, http://www.arcticcat.com/dirt/atvs/model/2016-en-mudpro-700-limited/, copyright 2015, 23 pages.
Boss Plow System for RANGER, at http:www.purepolaris.com/Detail.aspx?ItemID=2876870(PolarisPGACatalog), May 14, 2008, 2 pages.
Arctic Cat, Company Website, Prowler XT650 H1, undated; 9 pages.
BRP Can-Am Commander photo, undated; 1 page.
Buyer's Guide Supplement, 2006 Kart Guide, Powersports Business Magazine; 6 pages.
Can-Am Specifications for Commander 1000, copyright 2010, 1 page.
Can-Am Specifications for Commander 800R, copyright 2010; 1 page.
Can-Am, an 85-HP Side-By-Side. No, that's not a typo., dated Jun. 25, 2010, 3 pages.
Club Car, Company Website, product pages for XRT 1500 SE, undated; 2 pages.
Diver Down Snorkel for Polaris Scrambler 850/1000, High Lifter, last accessed Nov. 4, 2015, http://www.highlifter.com/p-4687-diver-down-snorkel-for-polaris-scrambler--8501000-see-apps.aspx; 1 page.
DuneGuide.com, "Product Review 2009 Honda Big Red MUV," retrieved from http:www.duneguide.com/ProductReview.sub.--Honda.sub.--BigRed.htm, May 20, 2008, 3 pages.
Honda HIPPO 1800 New Competition for Yamaha's Rhino, Dirt Wheels Magazine, Apr. 2006, pp. 91-92.
Yamaha, Company Website, Rhino 660 Auto 4 × 4 Exploring Edition Specifications, copyright 2006; 3 pgs.
International Search Report and Written Opinion received for PCT Patent Application No. PCT/US2016/031992, dated Sep. 19, 2016, 20 pages.
Kawasaki Mule the Off-Road Capable 610 4x4, Brochure 2011, copyright 2010, 6 pages.
Kawasaki Mule Utility Vehicle Brochure 2009, copyright 2008; 10 pages.
Kawasaki Teryx 750 Fl 4 × 4 Sport Brochure 2011, copyright 2010; 6 pages.
Kawasaki Teryx Recreation Utility Vehicle Brochure 2009, copyright 2008; 8 pages.
Yamaha, company website, 2006 Rhino 660 Auto 4X4, Copyright 2006, 4 pages.
Outlander X mr 850, available at https://can-am.brp.com/off-road/atv/outlander/outlander-x-mr-850.html; copyright 2003-2017; 3 pages.
Photograph of the Redline Riot, dated Jun. 28, 2010, available http://www.buggyworksandrails.com/images/102.sub.-0657.JPG., 1 page.
Polaris Ranger Brochure 2009, copyright 2008; 32 pages.
Polaris Ranger Brochure ATVs and Side x Sides Brochure 2010, copyright 2009, 26 pages.
Polaris Ranger Off-Road Utility Vehicles Brochure 2004, copyright 2003; 20 pages.
Polaris Ranger RZR Brochure 2011, copyright 2010; 16 pages.
Polaris Ranger Welcome to Ranger Country Brochure 2006, copyright 2005, 24 pages.
Polaris Ranger Work/Play Only Brochure 2008, copyright 2007, 28 pages.
Radiator Relocation Kit for Polaris Scrambler, High Lifter, http://www.highlifter.com/p-4598-radiator-relocation-kit-for-polaris-scra- mbler-8501000-see-apps.aspx, last accessed Nov. 4, 2015, 1 page.
Radiator Relocation Kit-Polaris Sportsman 550/850, High Lifter, http://www.highlifter.com/p-2686-radiator-relocation-kit-polaris-sportsma- n-550850-see-apps.aspx, last accessed Nov. 4, 2015, 2 pages.
New for 2004, Yamaha Rhino 660 4 × 4, ATV Connection Magazine, copyright 2006; 3 pages.

(56) References Cited

OTHER PUBLICATIONS

Redline Specs, copyright 2008, available at www.RedlinePerforms.com; 2 pages.
Renegade X MR 1000R, Can-Am, http://can-am.brp.com/off-road/atv/renegade/renegade-x-mr-1000R.html, copyright 2003-2015, 12 pages.
Yamaha, company website, 2006 Rhino 450 Auto 4X4, Copyright 2006, 3 pages.
Work/Play Only Ranger brochure, copyright 2007, Polaris Industries Inc., 28 pages.
Troy Merrifield & Damon Flippo, Rise of the Machine: Let the "Revolution" Begin. One Seat at a Time., CartWheelin' Magazine, published at least as early as Jan. 2008, available at http://www.1redline.com/news.sub.-events/PDF/cart.sub.-wheelin.sub.-ar-ticle.pdf, last accessed on Feb. 15, 2012, pp. 14-19.
Troy Merrifield, Redline's Rockin' Riot, UTV Off-Road Magazine, published in vol. 4, Issue 1, Feb./Mar. 2009, available at http://www.1redline.com/news.sub.-events/PDF/Redline.sub.-Riot.sub.-Ar-ticle.sub.-01.sub.-2009.pdf., last accessed on Feb. 15, 2012, pp. 16-19.
Welcome to Ranger Country brochure, copyright 2005, Polaris Industries Inc., 24 pages.
Welcome to Ranger Country brochure, copyright 2006, Polaris Industries Inc., 20 pages.
Office Action issued by the Canadian Intellectual Property Office, dated Oct. 27, 2020, for Canadian Patent Application No. 3,044,002; 4 pages.

\* cited by examiner

US 10,946,736 B2

ALL-TERRAIN VEHICLE

FIELD OF THE DISCLOSURE

The present disclosure generally relates to an ALL TERRAIN VEHICLE (ATV) and, more particularly, to an ATV having improved ergonomics and performance.

BACKGROUND OF THE DISCLOSURE

Generally, ATVs are used to carry one or two passengers and a small amount of cargo over a variety of terrains. Due to increasing recreational interest in ATVs, specialty ATVs, such as those used for trail riding, racing, and cargo hauling have entered the market place. Most ATVs include an engine including between one and three cylinders. Most ATVs include a straddle or saddle type seat positioned above the engine. Some ATVS are designed with particular terrains in mind. The present application is more particularly suitable for an ATV known as a "mudder" for operating in an around lakes and stream where water and mud are predominant.

SUMMARY OF THE DISCLOSURE

In a first embodiment, an all-terrain vehicle (ATV), comprises a frame; ground engaging members supporting the frame, including front and rear ground engaging members; a steering input mechanism; a radiator coupled to the frame forward of the steering input mechanism; and a hood rotatably coupled to the frame and having an open position providing access to the radiator and a closed position enclosing the radiator.

In another illustrative embodiment, an all-terrain vehicle (ATV) comprises a frame comprised of a main frame portion and a front frame subassembly, wherein the front frame subassembly comprises substantially vertical members and rearwardly extending members; ground engaging members supporting the frame, including front and rear ground engaging members; a steering input mechanism; a radiator coupled to the rearwardly extending members of the front frame subassembly; and a winch is coupled to the substantially vertical members of the front frame subassembly.

BRIEF DESCRIPTION OF THE DRAWINGS

The invention will now be described by way of reference to the drawing figures, where.

Corresponding reference characters indicate corresponding parts throughout the several views. Unless stated otherwise the drawings are proportional.

DETAILED DESCRIPTION OF THE DRAWINGS

With reference first to FIGS. 1-7, the ATV of the present disclosure will be described in greater detail. As shown, the ATV disclosed herein is a mudder version of the ATV shown and described in U.S. patent application Ser. No. 15/895,495, filed Feb. 13, 2018, the subject matter of which is disclosed herein by reference.

Figure 1:
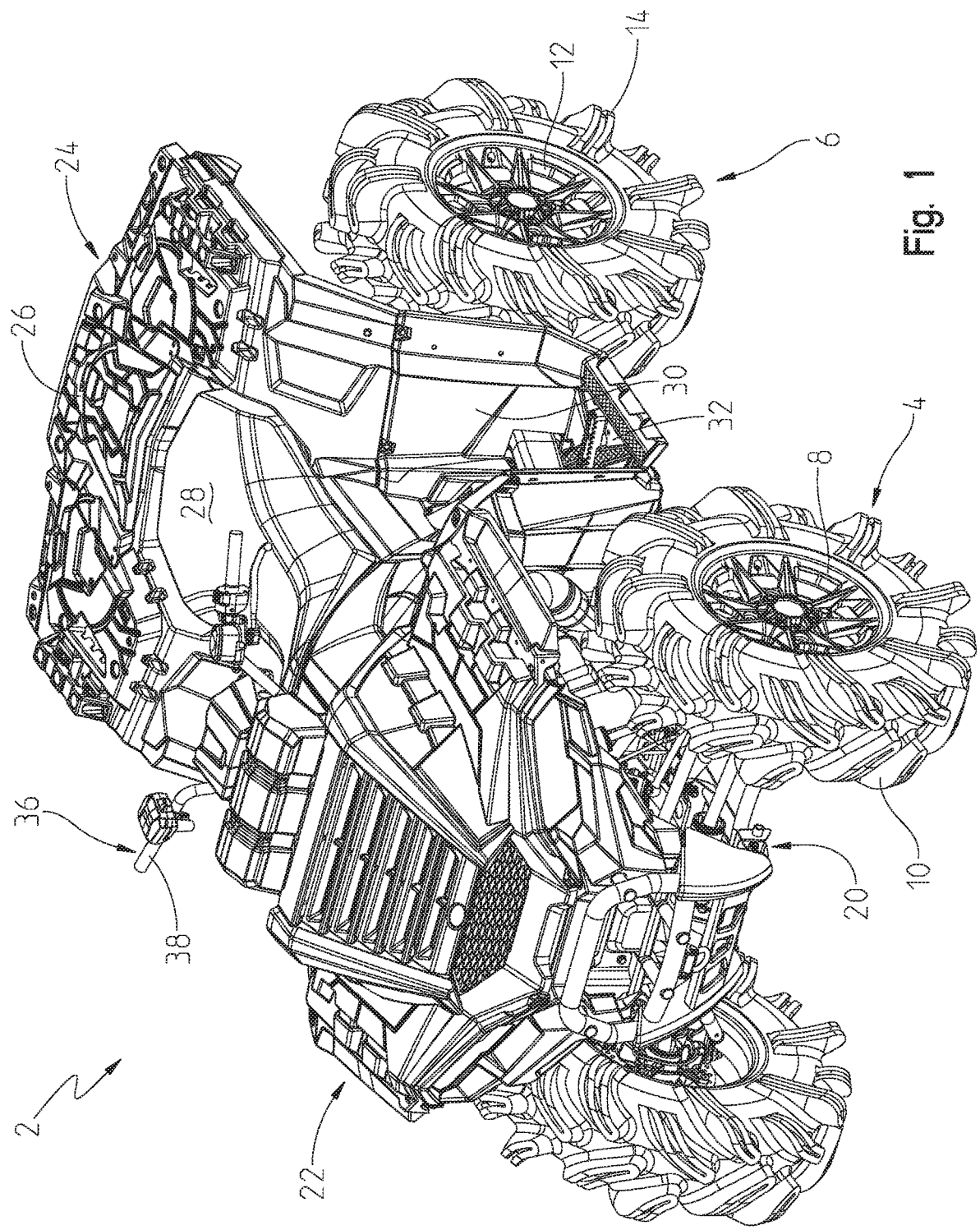
FIG. 1 is a front left perspective view of the ATV of the present disclosure.
Figure 2:
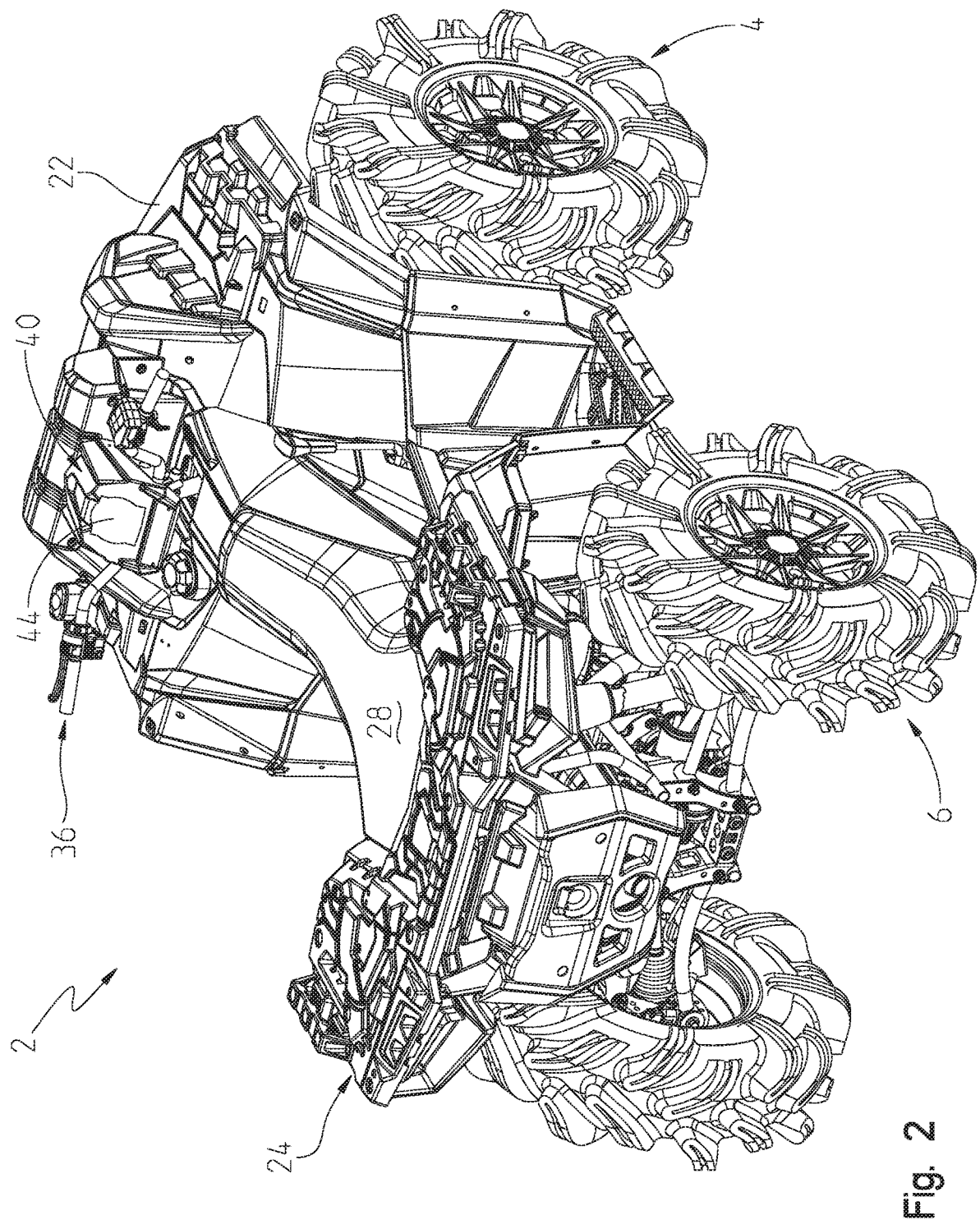
FIG. 2 is a right rear perspective view of the ATV of FIG. 1.
Figure 3:
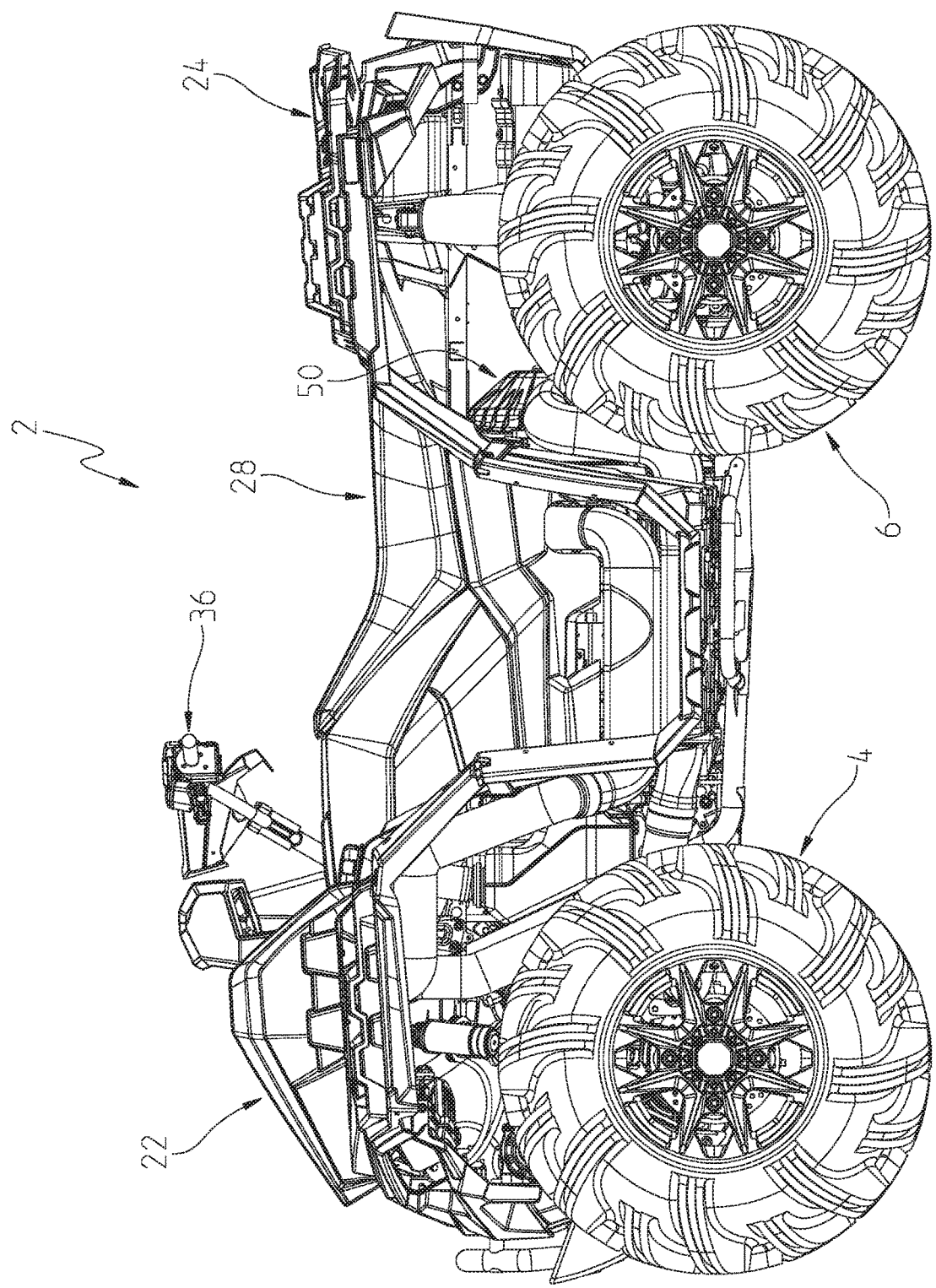
FIG. 3 is a left side view of the ATV.
Figure 4:
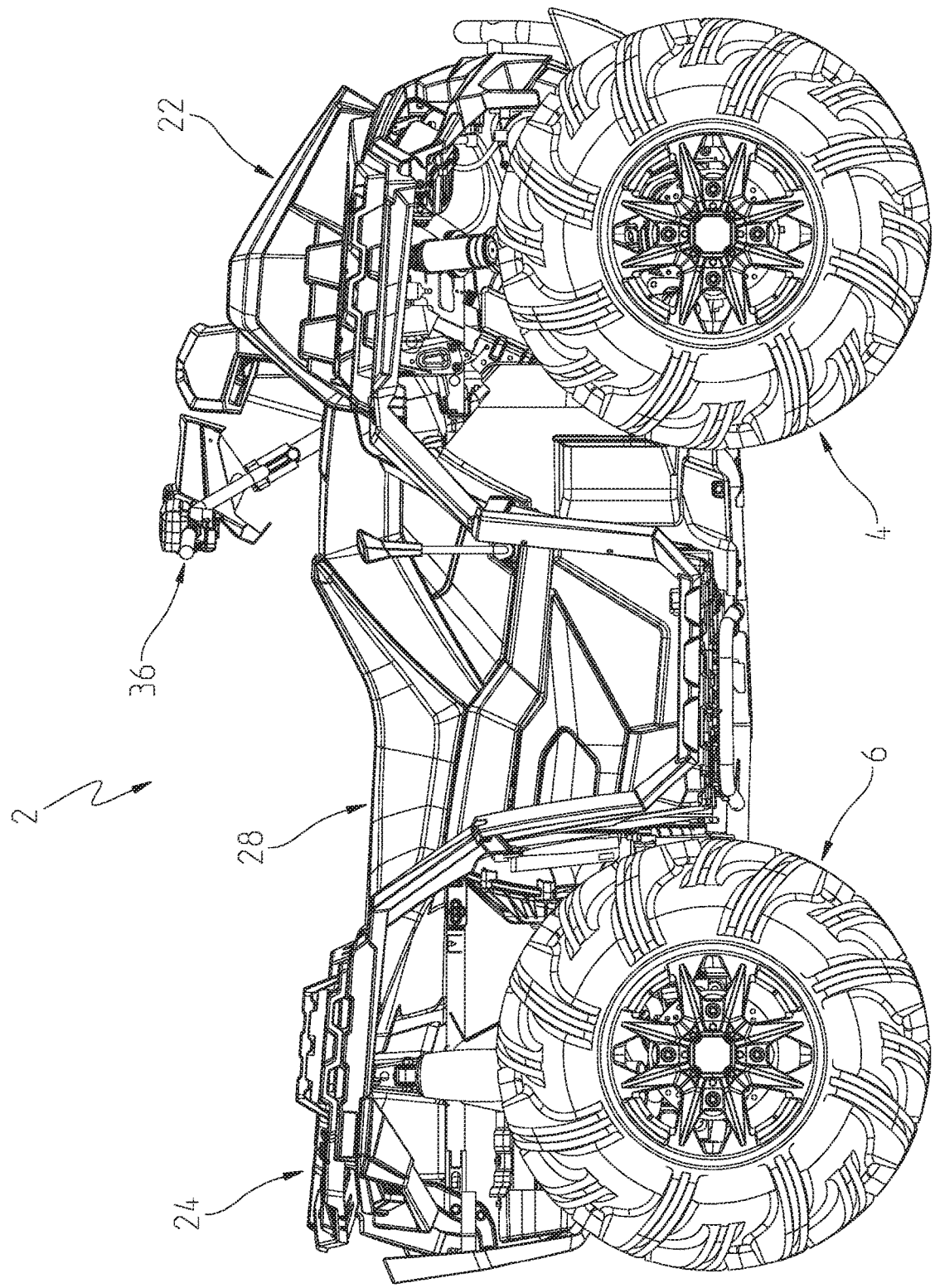
FIG. 4 is a right side view of the ATV.
Figure 5:
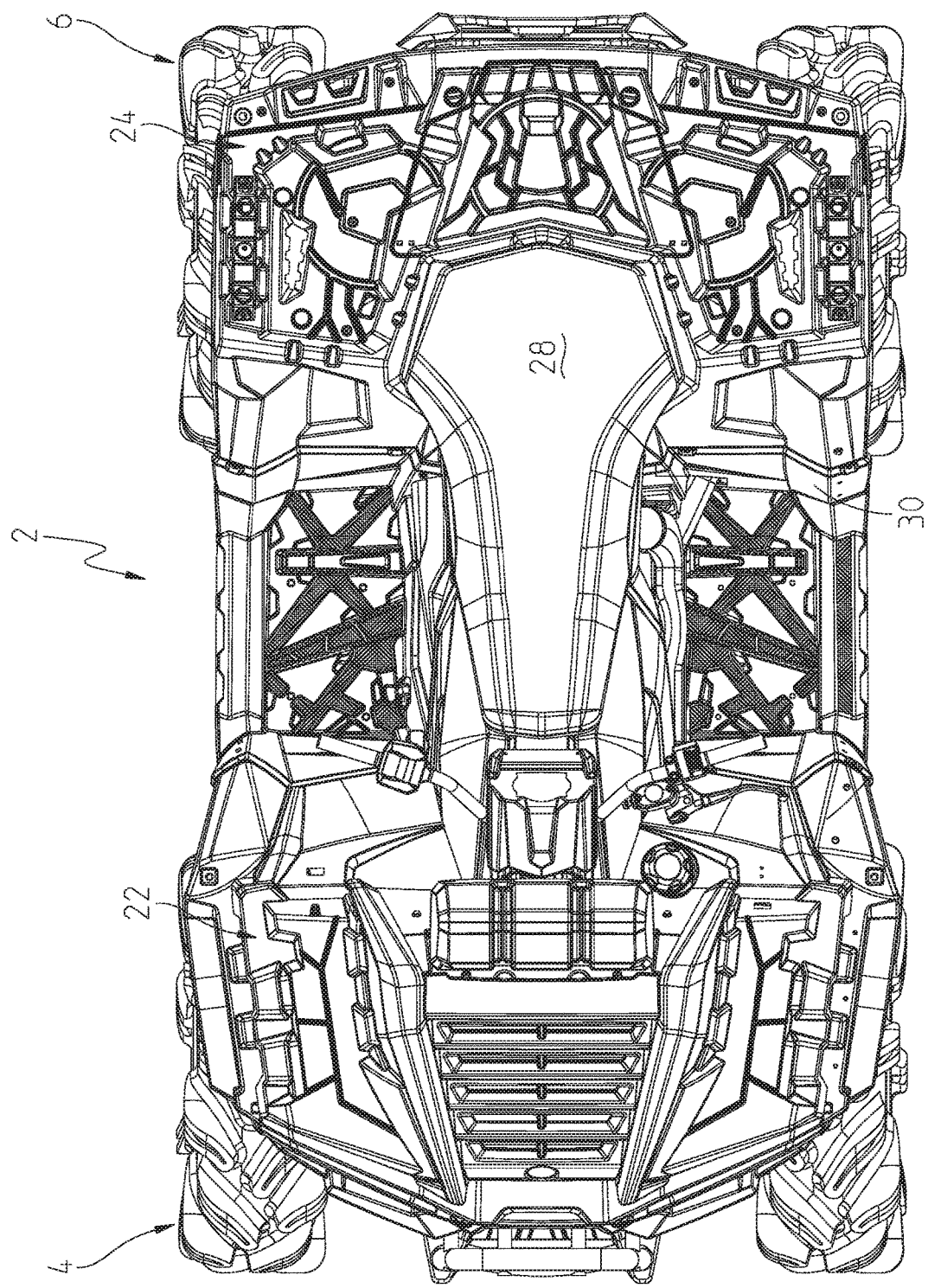
FIG. 5 is a top view of the ATV.
Figure 6:
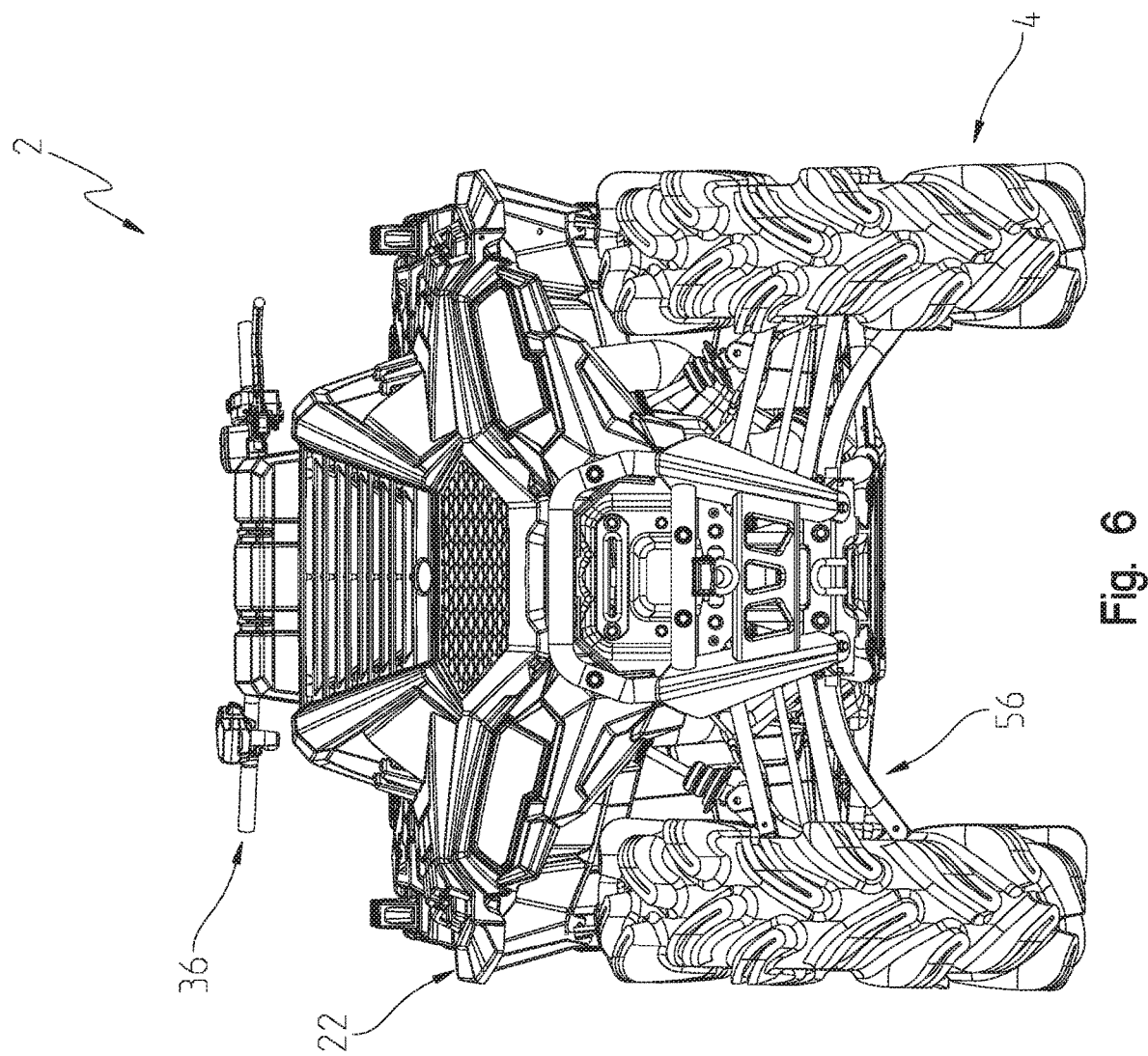
FIG. 6 is a front view of the ATV.
Figure 7:
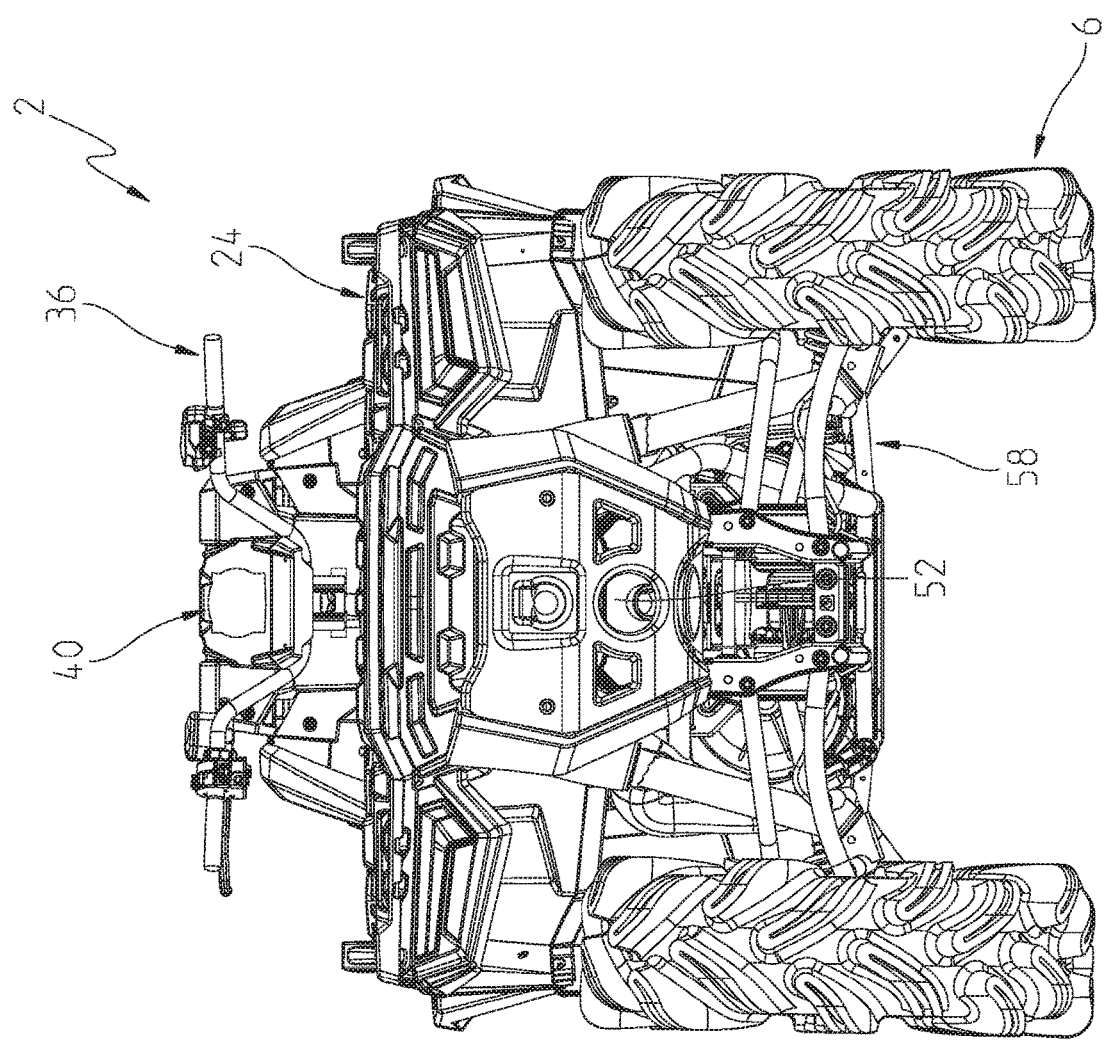
FIG. 7 is a rear view of the ATV.
Figure 8:
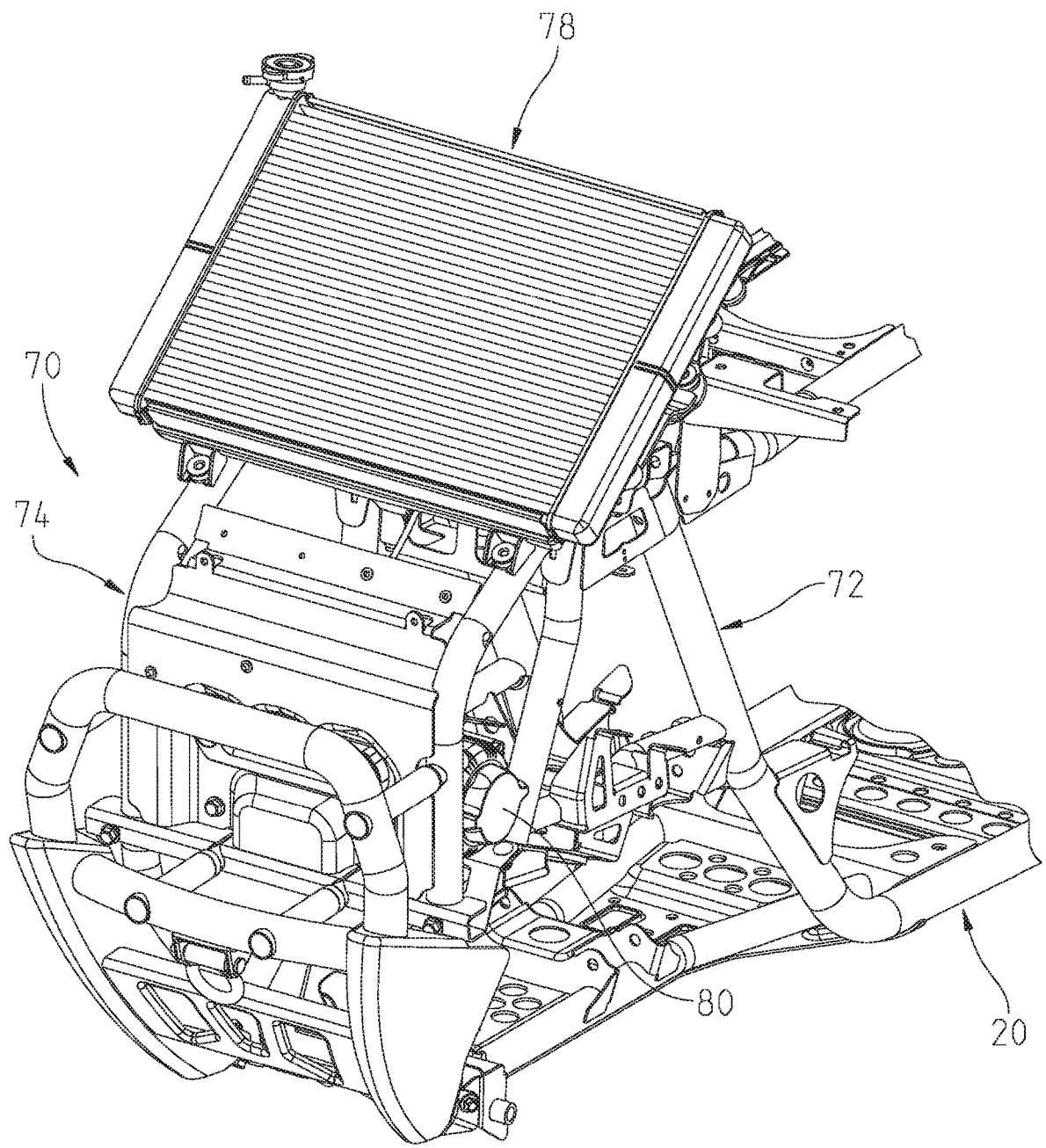
FIG. 8 is a front left perspective view of the front frame for the ATV of FIGS. 1-7.
Figure 9:
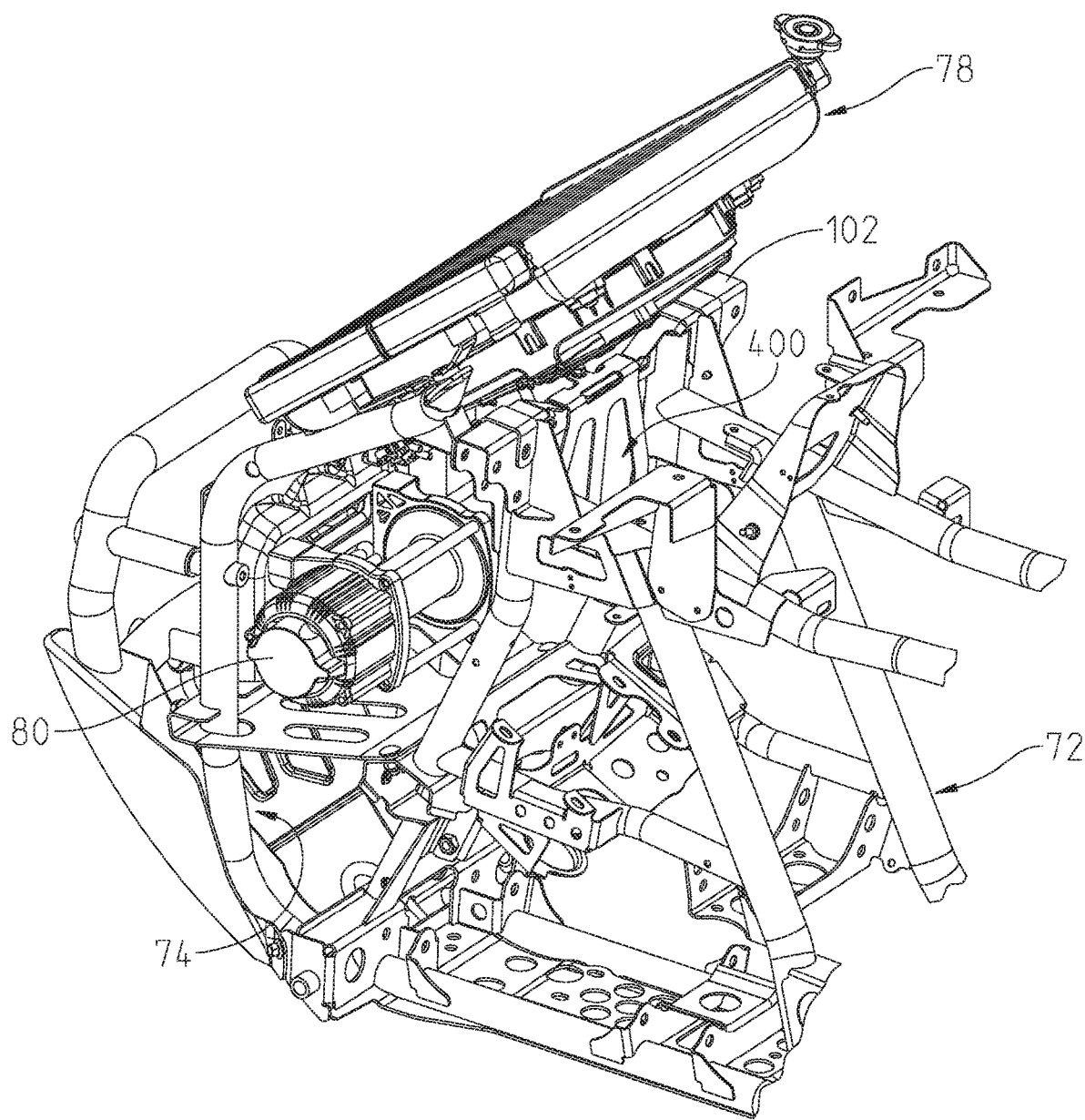
FIG. 9 is a right rear perspective view of the frame of FIG. 8.

As shown, ATV is shown generally at 2 and comprises front wheels 4 and rear wheels 6. Front wheels 4 include rims 8 and tires 10, whereas rear wheels 6 include rims 12 and tires 14. Wheels 4 and 6 support a frame 20 which in turn supports a front body portion 22, a rear body portion 24 including a rack 26, a seat 28 and a mid-body portion 30 including a foot well 32. ATV 2 includes a steering system 36 including handlebars 38 for steering ATV 2, as further described in U.S. patent application Ser. No. 15/895,495, filed Feb. 13, 2018, the subject matter of which is disclosed herein by reference. A pod 40 (FIG. 2) is coupled to handlebars 38 and includes a control display 44. ATV 2 further comprises a powertrain 50 (FIG. 3) including an exhaust system 52 (FIG. 7). Finally, ATV 2 includes a front suspension system 56 (FIG. 6) and a rear suspension 58 (FIG. 7).

As will be disclosed herein, ATV 2 can be provided in two widths, that is a 48" width and a 55" width. In accordance with the present disclosure, the frame 20, body components 22, 24 and 30, and powertrain 50 are identical for the two vehicle widths. Rather, the front and rear suspensions 56, 58 interchange to provide the wider vehicle, as disclosed herein.

With reference now to FIGS. 8-12, frame 20 will be described in greater detail. As shown, frame 20 is substantially similar to that described in U.S. patent application Ser. No. 15/895,495, filed Feb. 13, 2018, the subject matter of which is disclosed herein by reference. As shown, frame 20 includes a front frame portion 70 and a main frame portion 72. Front frame portion 70 includes a front frame subassembly 74 which supports a radiator 78 and a winch 80. As shown best in FIG. 10, front frame subassembly 74 is removable from the main frame portion 70 and generally includes substantially vertical members 82 and rearwardly and upwardly extending members 84 which turn outwardly at portions 86 and include flange portions at 88. Vertical members 82 further include portions 92 which extend downwardly and rearwardly having flanges 94.

Figure 10:
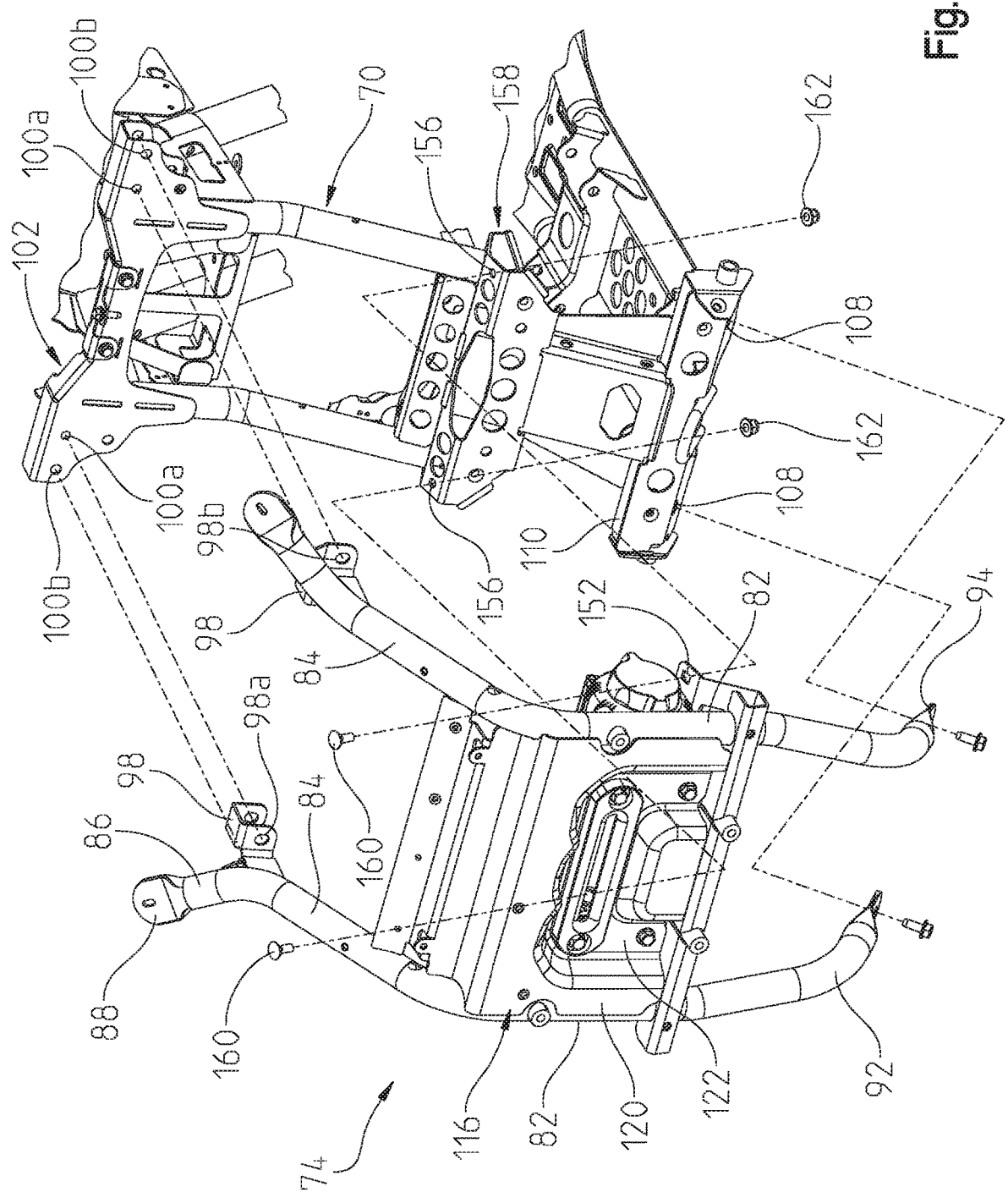
FIG. 10 is a front left perspective view of the frame of FIG. 8 in an exploded manner.

As shown best in FIG. 10, front frame subassembly 74 is coupled to the main frame portion 70. Front frame subassembly 74 includes brackets 98 having mounting apertures at 98a and 98b which align with apertures 100a and 100b respectively on shock tower 102 of main frame portion 70. Furthermore flanges 94 include apertures 106 (FIG. 12) which align with apertures 108 of horizontal support 110.

Figure 12:
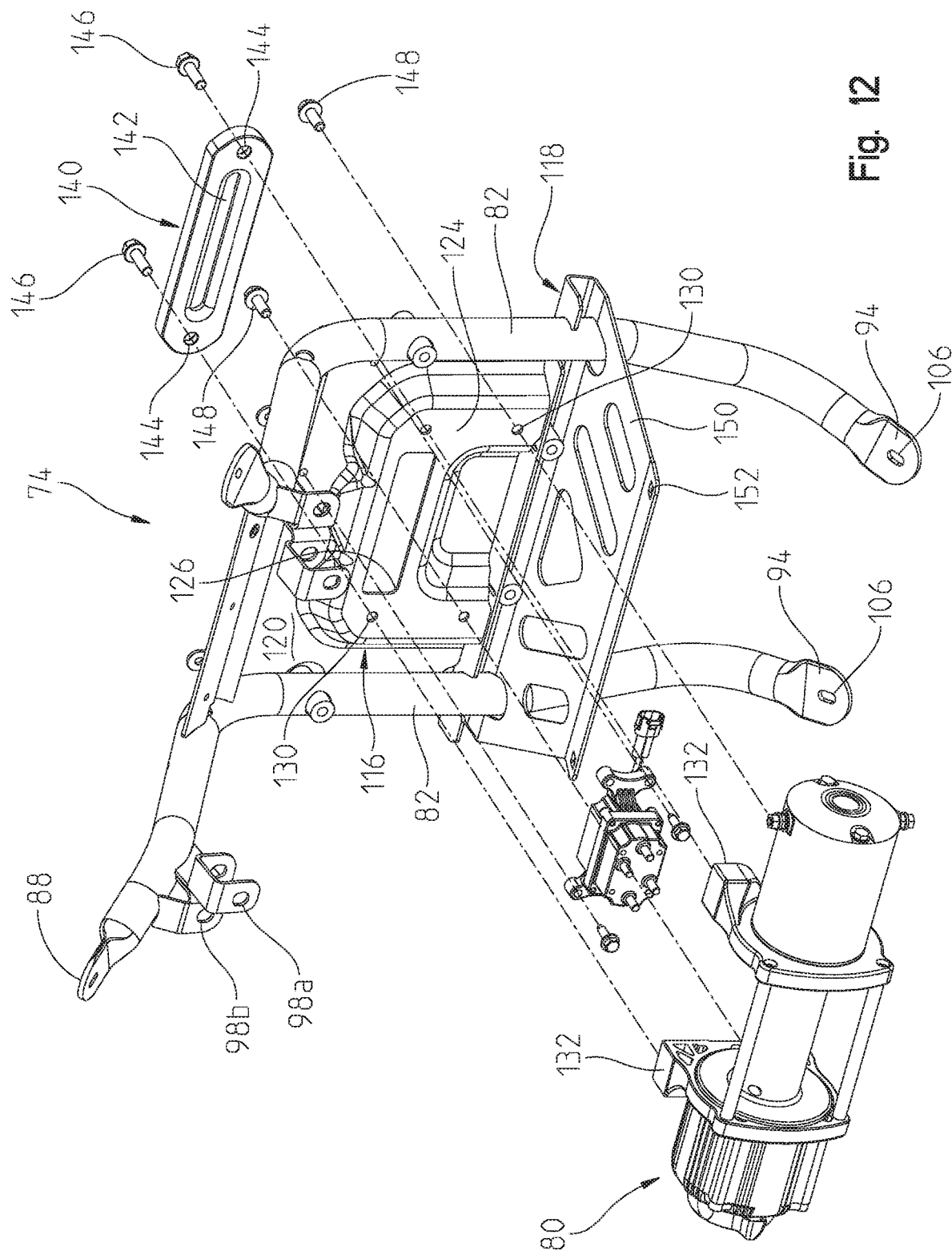
FIG. 12 is a rear right perspective view of the frame of FIG. 8 with the winch exploded from the frame.

With reference now to FIG. 12, front frame subassembly 74 includes a winch support plate 116 and a support bracket 118. Support plate 116 includes a plate portion 120 which spans the vertical members 82 and a concave portion 122 (FIG. 10) which forms a back wall 124 (FIG. 12) having an opening 126 therethrough. Back wall 124 also includes apertures 130 for mounting of winch 80. Winch 80 includes pedestals 132 having threaded apertures (not shown) which align with the four apertures 130. A cable lead member 140 is also provided having a cable feed slot 142 and apertures 144. Fasteners 146 may be received through apertures 144 and upper apertures 130, whereupon fasteners 146 are received in threaded apertures of winch pedestal 132. This aligns slot 142 with opening 126. Fasteners 148 may be received through lower apertures 130 and into the winch pedestal 132.

With reference still to FIG. 12, support bracket 118 also spans vertical members 82 and includes a plate portion 150 having apertures 152 at a rearward edge thereof. As shown best in FIG. 10, apertures 152 align with apertures 156 of horizontal support 158, allowing fasteners 160, 162 to retain plate 150 to the horizontal support 158.

Figure 11:
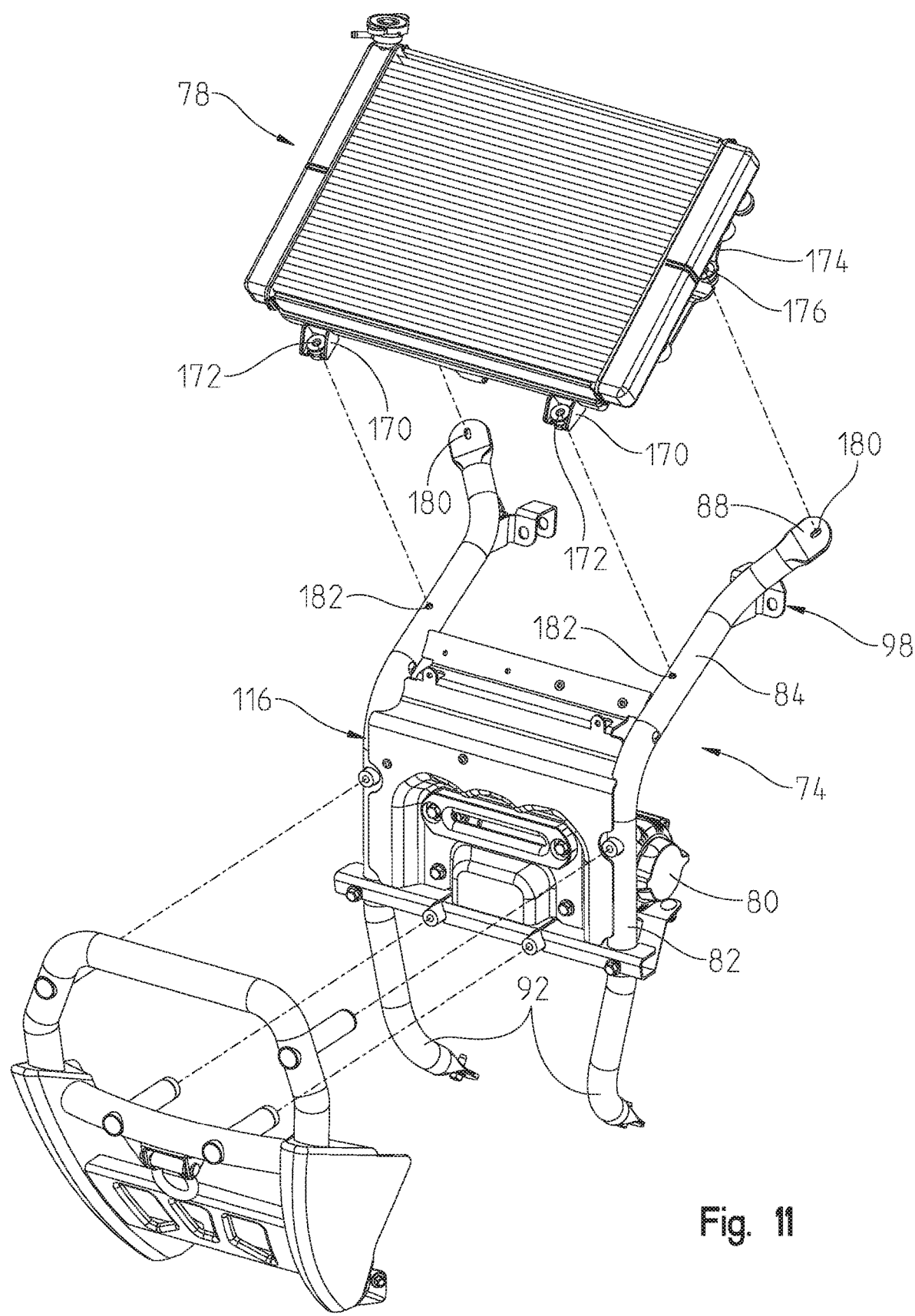
FIG. 11 is a front left perspective view of the frame of FIG. 8 with the radiator exploded from the frame.

As shown best in FIG. 11, radiator 78 is also coupled to the front frame subassembly 74. As shown, radiator 78 has mounting feet 170 having apertures 172; and mounting feet 174 having apertures 176. Apertures 176 align with apertures 180 of flanges 88 and apertures 172 align with apertures 182 of rearwardly extending members 84. As shown best in FIG. 13, radiator 78 extends at an angle relative to horizontal axis. As shown, radiator extends at an angle β, where β is less than 45°, and as shown is approximately 35°. With reference now to FIGS. 13-17, the front body 22 will be described in further detail.

Figure 13:
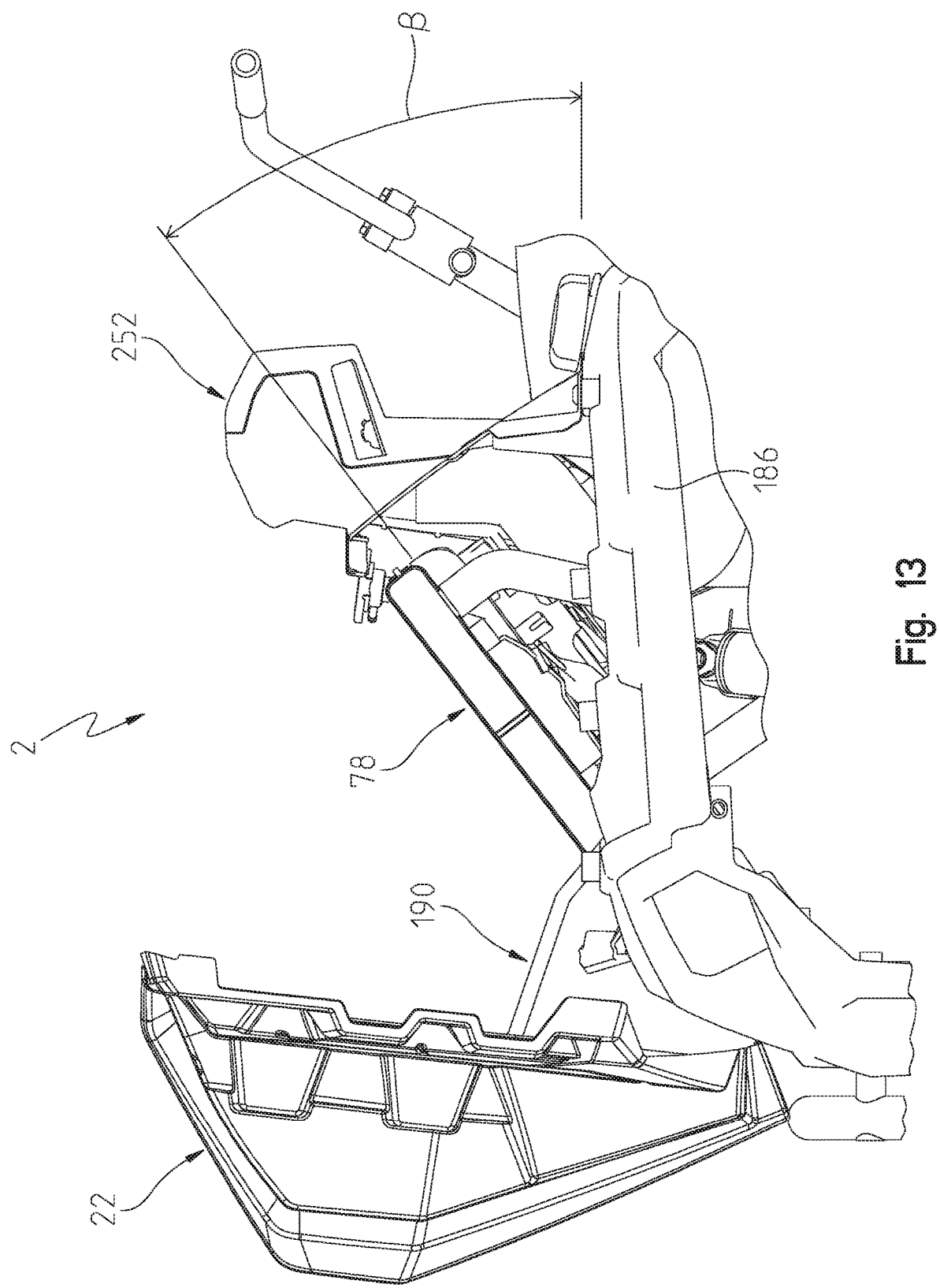
FIG. 13 is a left side view of the vehicle showing the hood in a rotated forward position.
Figure 14:
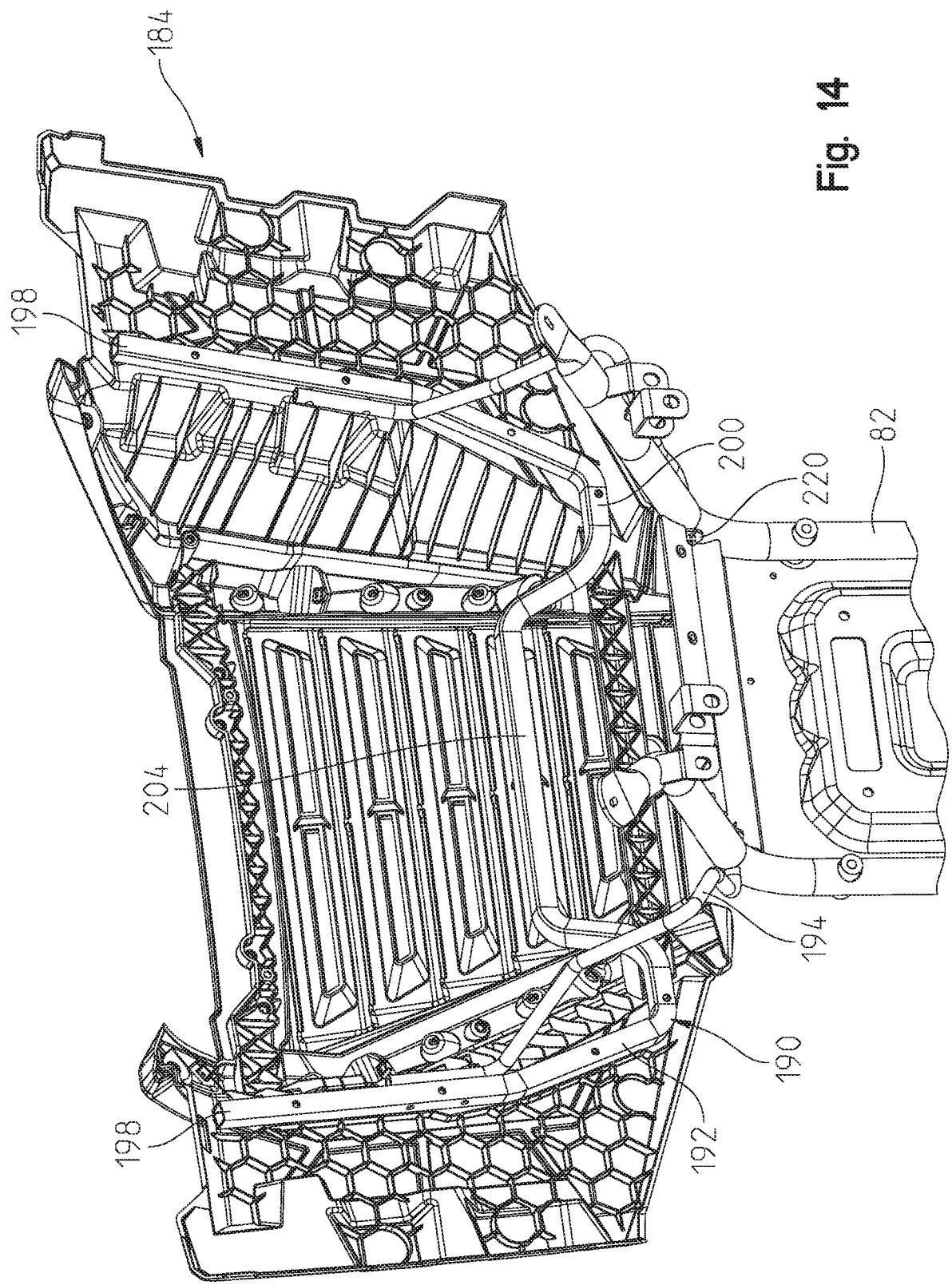
FIG. 14 is a rear perspective view of the hood in the position of FIG. 13.
Figure 15:
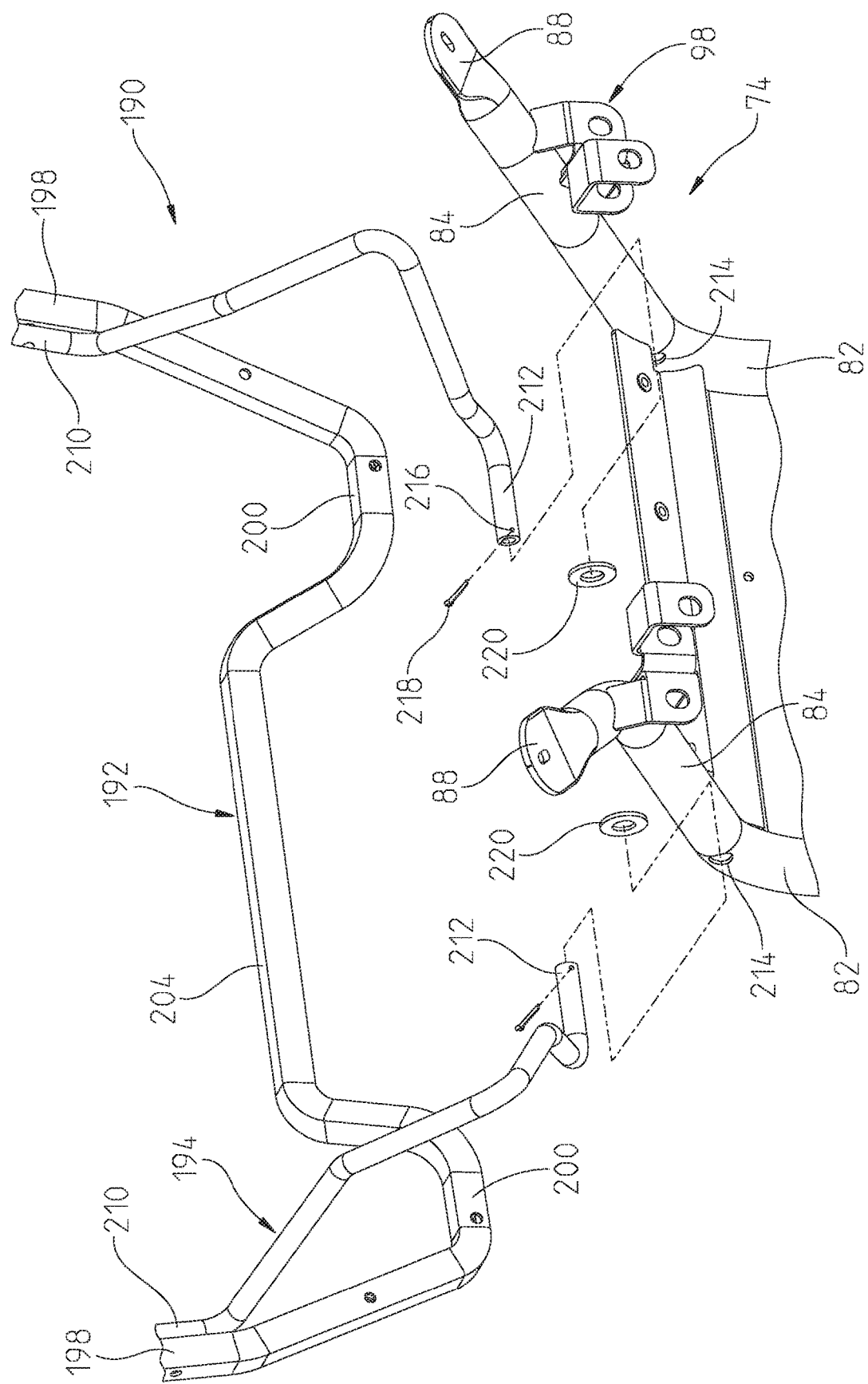
FIG. 15 is an exploded view of the hood frame.
Figure 16:
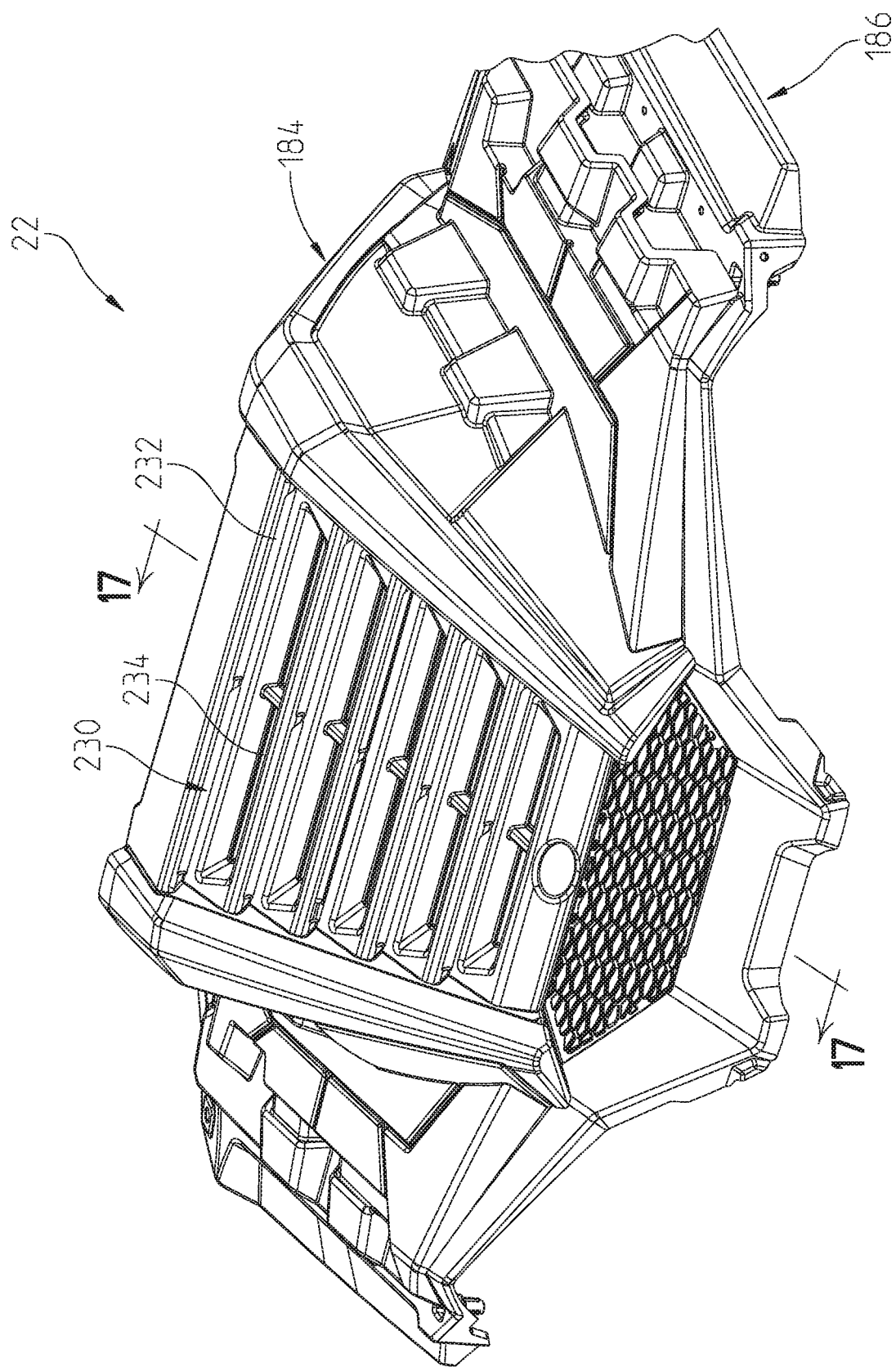
FIG. 16 is a front left perspective view of the hood.

As shown in FIG. 16, the front body 22 is comprised of at least a hood portion 184 and a front body portion 186. As shown in FIG. 13, the hood portion 184 of front body 22 is shown in a rotated open position providing access to radiator 78. Vehicle 2 further includes a hinged frame 190 supporting and allowing the rotation of, front body 22. As shown best in FIGS. 14 and 15, the hinged frame 190 includes a frame portion 192 and a hinge portion 194. Frame portion 192 is profiled for coupling to an inside of front body portion 22 as best shown in FIG. 14, having longitudinally extending tubes at 198, U-shaped sections 200 and transverse section 204. Hinge portion 194 is attached to frame portion 192, having sections 210 (FIG. 15) coupled to longitudinally extending tubes 198. Hinge portion 194 includes an axle portion 212 at ends thereof, which extend through apertures 214 of front frame subassembly 74. Each axle portion 212 includes an aperture 216 for receipt of a cotter pin 218, which may be positioned through aperture 216 after axle portion is positioned through aperture 214 as is known in the art. Washers 220 may be positioned between the cotter pins 218 and the vertical members 82, as shown best in FIG. 14.

Figure 17:
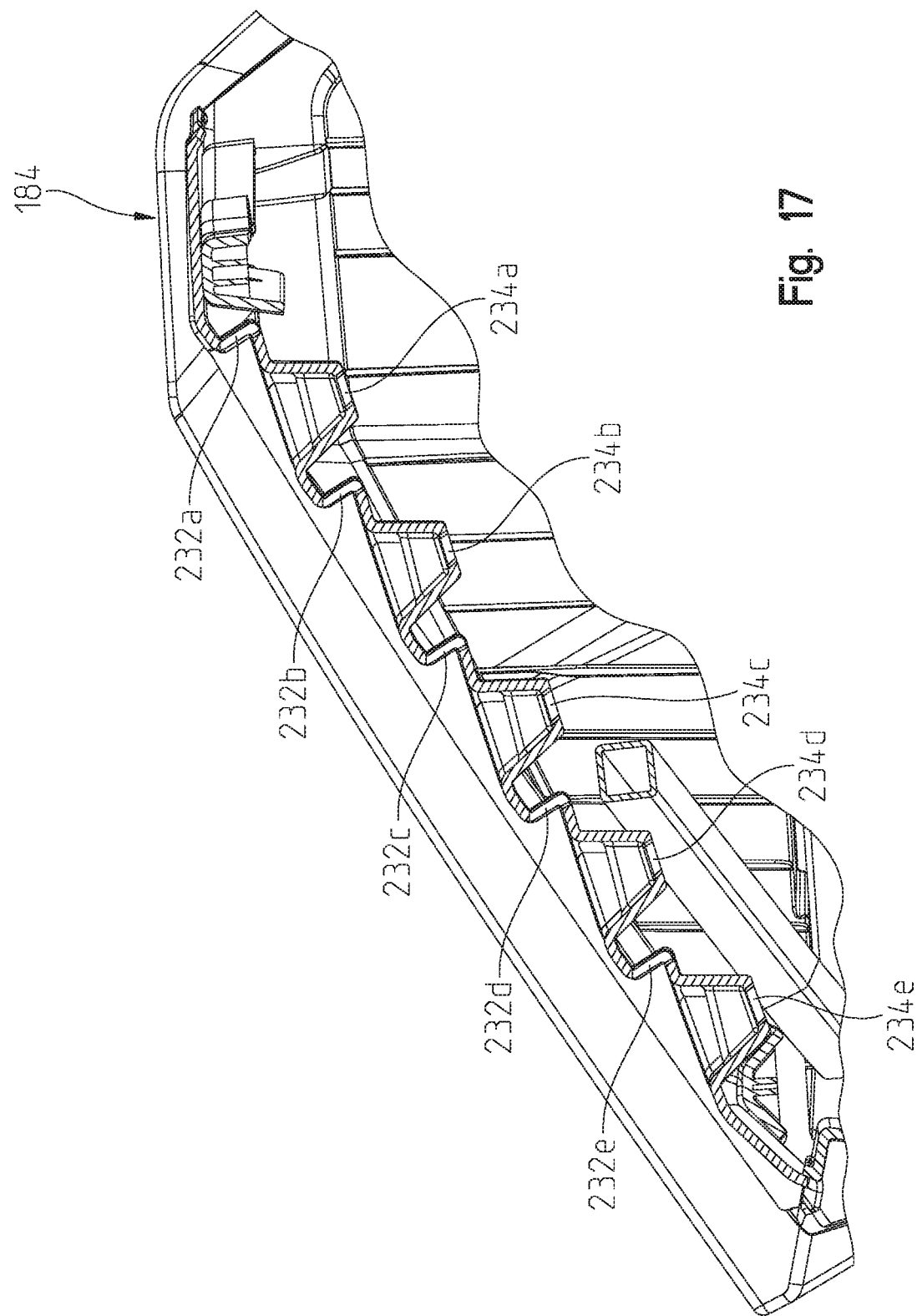
FIG. 17 is a cross sectional view taken through lines 17-17 of FIG. 16.
Figure 18:
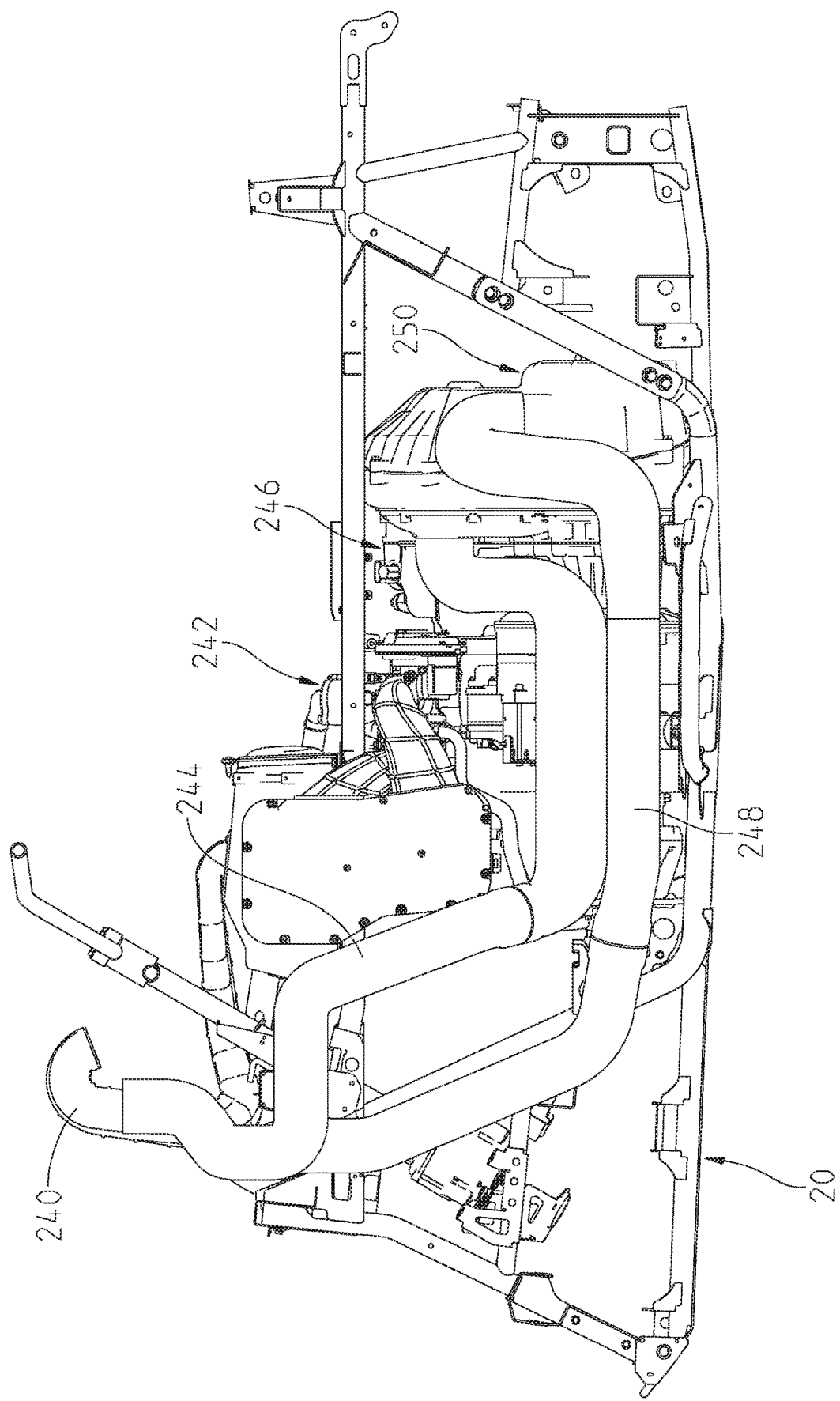
FIG. 18 is a side view of the vehicle power train and frame.
Figure 19:
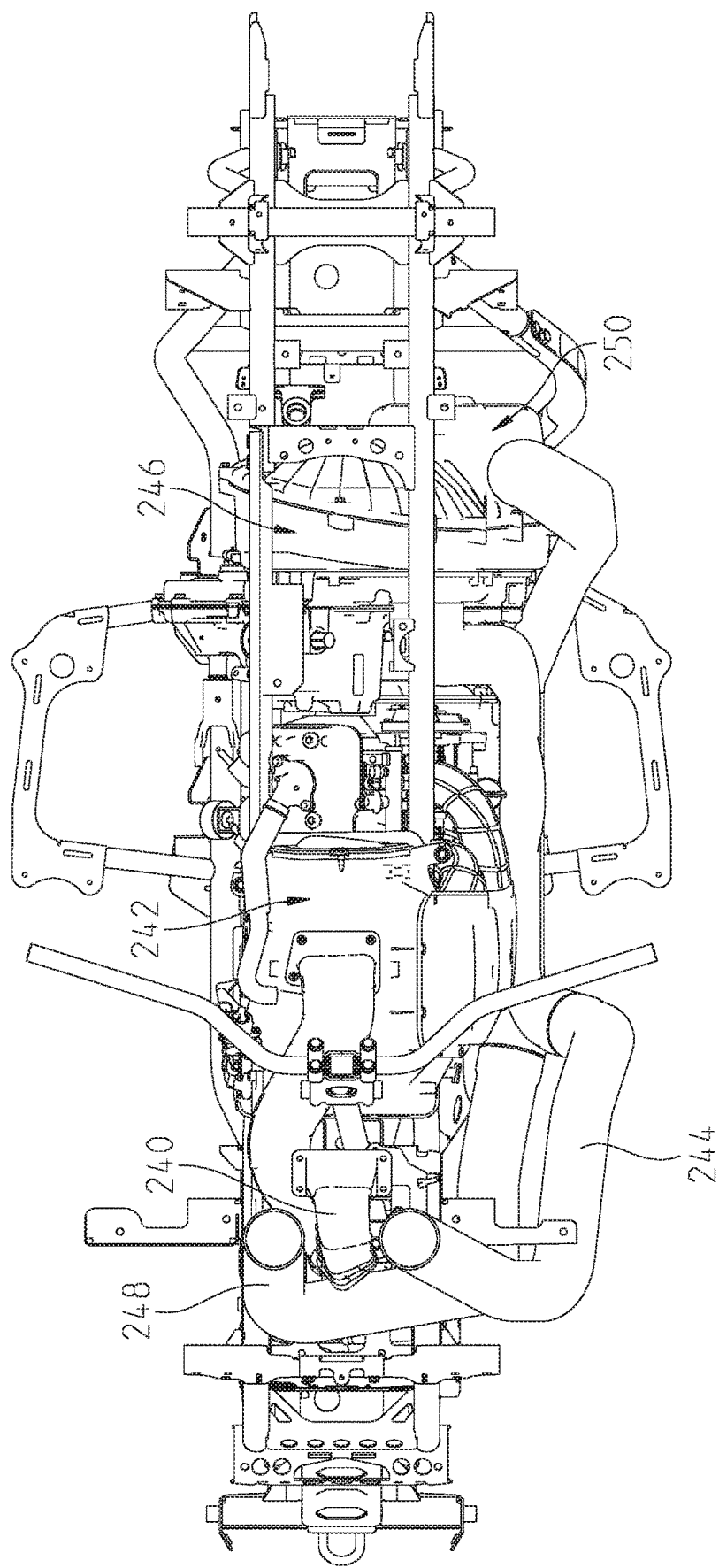
FIG. 19 shows a top view of the vehicle of FIG. 18.
Figure 20:
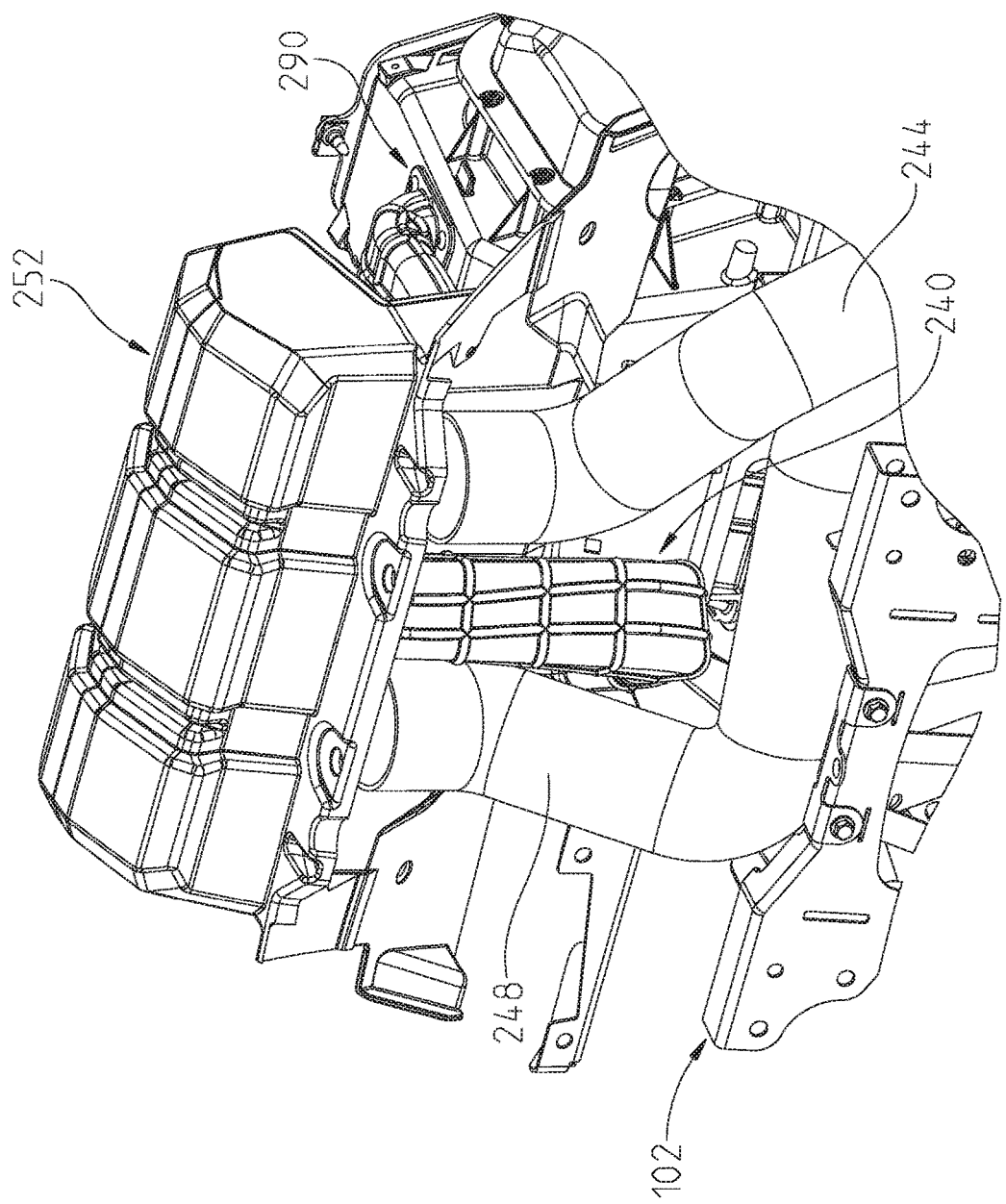
FIG. 20 is a front left perspective view of the vehicle air intake system.
Figure 21:
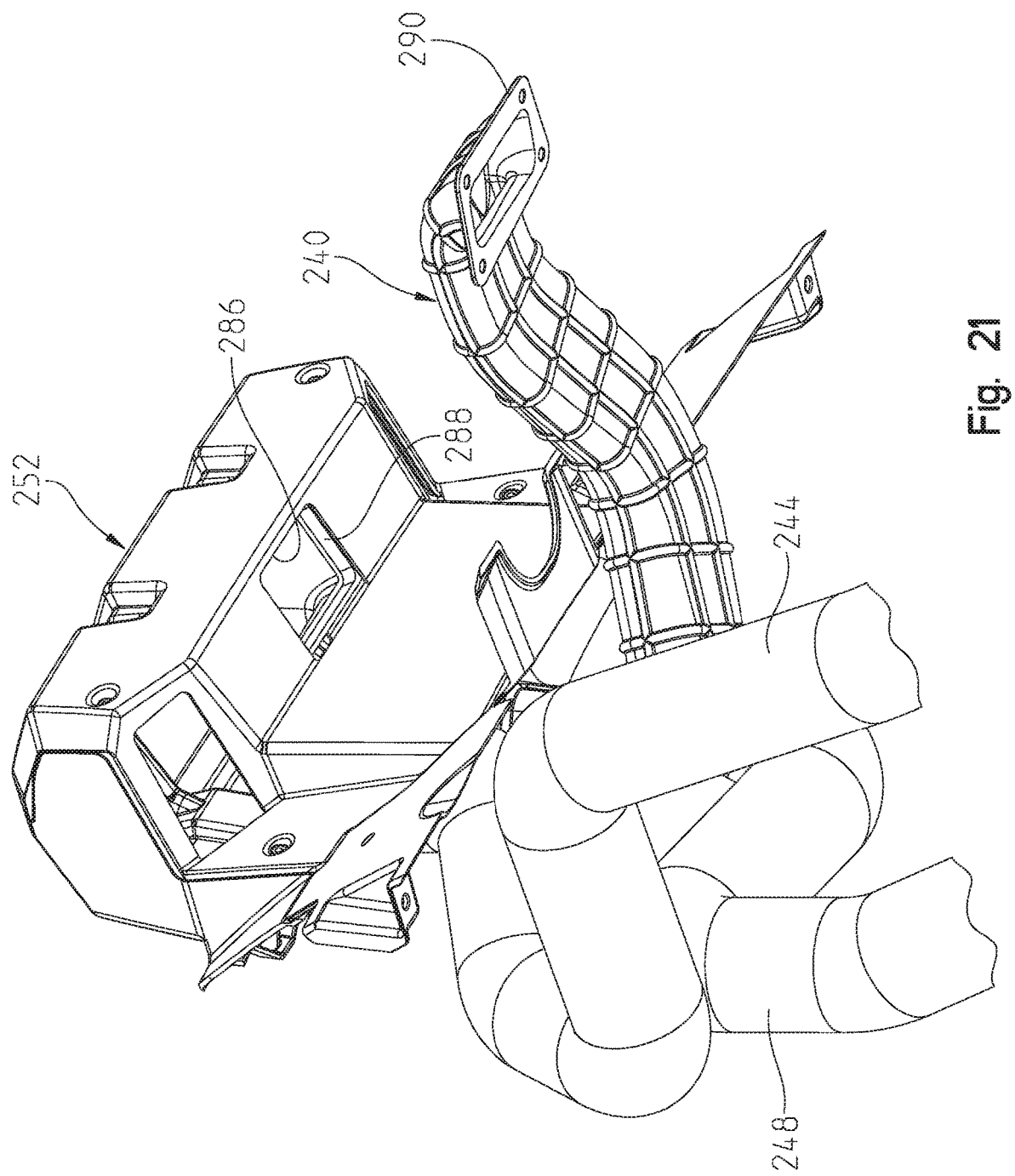
FIG. 21 is a lower perspective view of the vehicle air intake system shown in FIG. 20.

As shown in FIGS. 14, 16 and 17, the front body 22 defines a grill portion 230 having vents 232 and 234. As shown best in the cross-sectional view of FIG. 17, a plurality of vents 232 and 234 are provided. Namely, vents 232 include individual vents 232a, 232b, 232c, 232d and 232e. In a similar manner, vents 234 include individual vents 234a, 234b, 234c, 234d and 234e. As such, vents 232a, 232b, 232c, 232d and 232e provide an opening which is substantially parallel to radiator 78, whereas vents 234a, 234b, 234c, 234d and 234e provide an opening which is substantially perpendicular to radiator 78.

Thus, as described the front body 22 is rotatable to the position of FIG. 13, where the body portion is in an over center position to retain the front body 22 in an open position. In this position the radiator may be cleaned as well as the vents 232, 234.

With reference now to FIGS. 18-25 the air ducting of the present vehicle will be described in greater detail. As shown, the air ducting consists of three ducts, a center duct 240 for engine 242; a left hand side duct 244 for transmission 246; and a duct 248 for continuously variable clutch (CVT) 250. Duct cover 252 (FIG. 20) is provided over ends of the ducts 248 and 244. The ducts 240, 244 and 248 are made from rubber, which provides an advantage over previous ducts. The former ducts were blow molded which required a rubber connector and two clamps, whereas the rubber ducts require a single clamp.

Cover 252 is provided in two components 254 and 256 (FIG. 22) which conform together to define the cover 252. Covers components 254 and 256 couple together (FIG. 23) by way of fasteners 260 through apertures 262 and into threaded bosses 264. Fasteners 266 extend through apertures 268 of component 256 and into threaded engagement with apertures 270 of front body portion 186 to couple cover 252 to front body portion 186. As shown, front body portion 186 is one portion which makes up the entire front body 22, as shown best in FIG. 16. In a like manner, fasteners 276 extend through apertures 278 and into threaded apertures 280 of posts 282. Thus, and as best shown in FIG. 13, only the hood portion 184 of front body 22 rotates forwardly, whereas front body portion 186 remains coupled to the frame.

Figure 22:
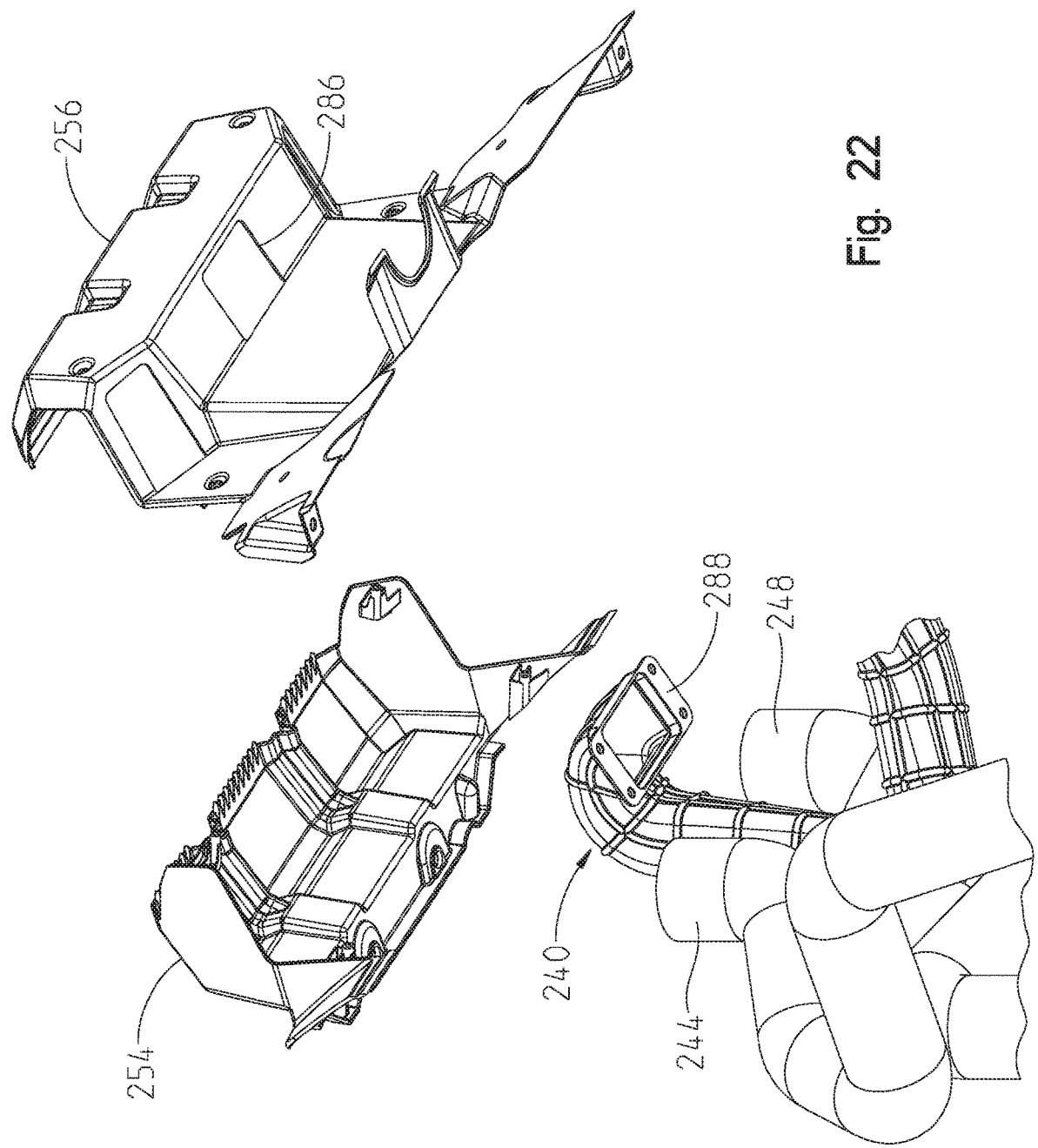
FIG. 22 is an underside exploded view showing the vehicle air intake system of FIG. 21.
Figure 23:
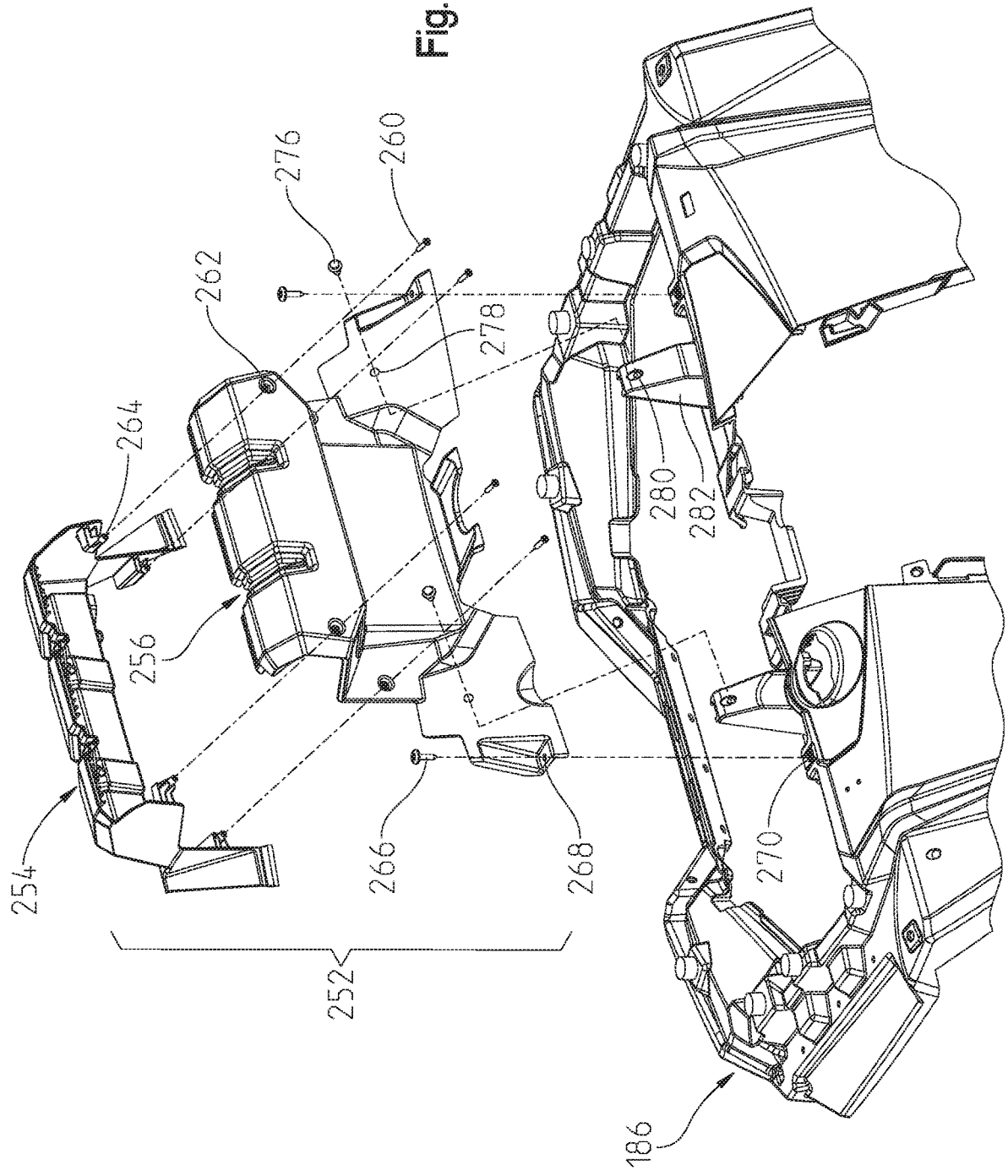
FIG. 23 shows a view similar to that of FIG. 22 showing the air intake cover exploded from the ATV body.

With reference now to FIG. 22, cover component 256 includes an opening 286, which conforms to flange portion 288 of duct 240. Duct 240 includes an opposite end flange 290 (FIG. 24) which couples to engine 242. Given the fact that the engine duct is centrally located within the vehicle and within the cover, the engine duct is protected from taking in water.

Figure 24:
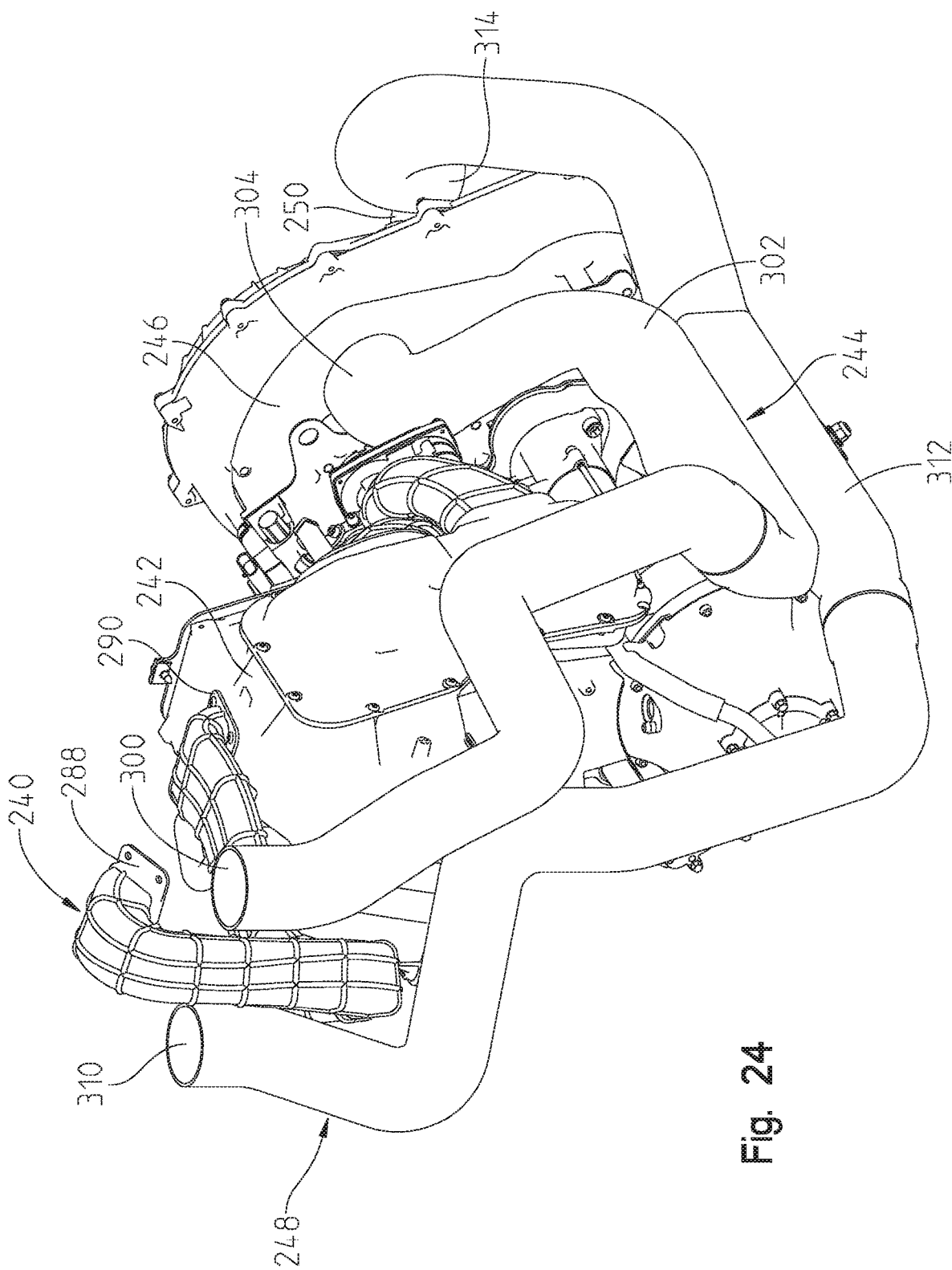
FIG. 24 shows a front left perspective view of the air intake system and power train.
Figure 25:
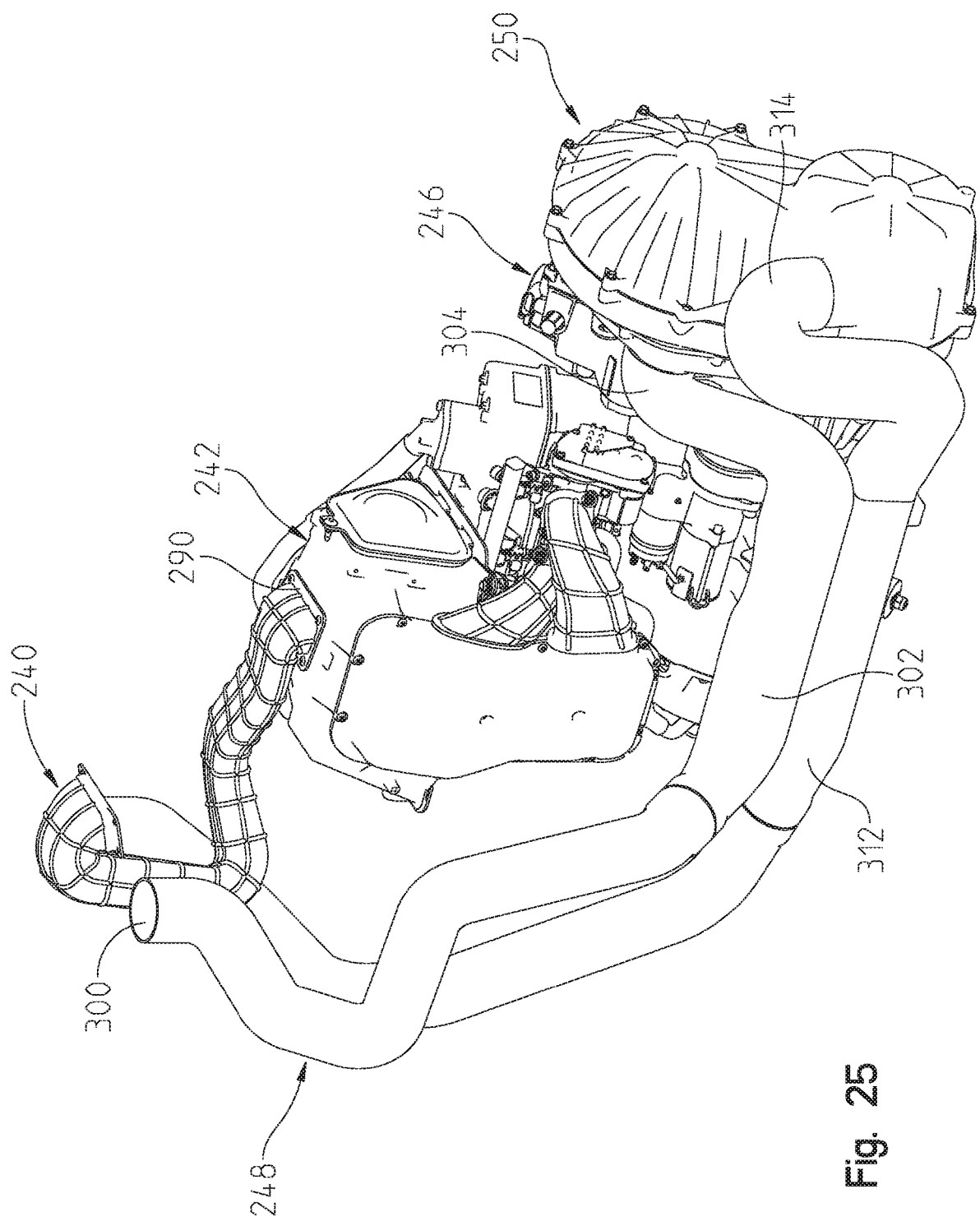
FIG. 25 shows a rear left perspective view of the air intake system and power train of FIG. 24.

With reference now to FIGS. 24 and 25, ducts 244 and 248 will be described in greater detail. As shown, Duct 244 includes a duct opening 300 which transitions downwardly to duct portion 302 and thereafter to duct outlet 304 and into transmission 246. Duct 248 similarly includes a duct opening 310 which transitions downwardly to duct portion 312 and thereafter to duct outlet 304 into CVT 250. It should be understood that ducts 244 and 248 deliver cooling air to transmission 246 and CVT 250, respectively; whereas the duct 240 delivers air for the air/fuel mixture for combustion within engine 242.

Figure 26:
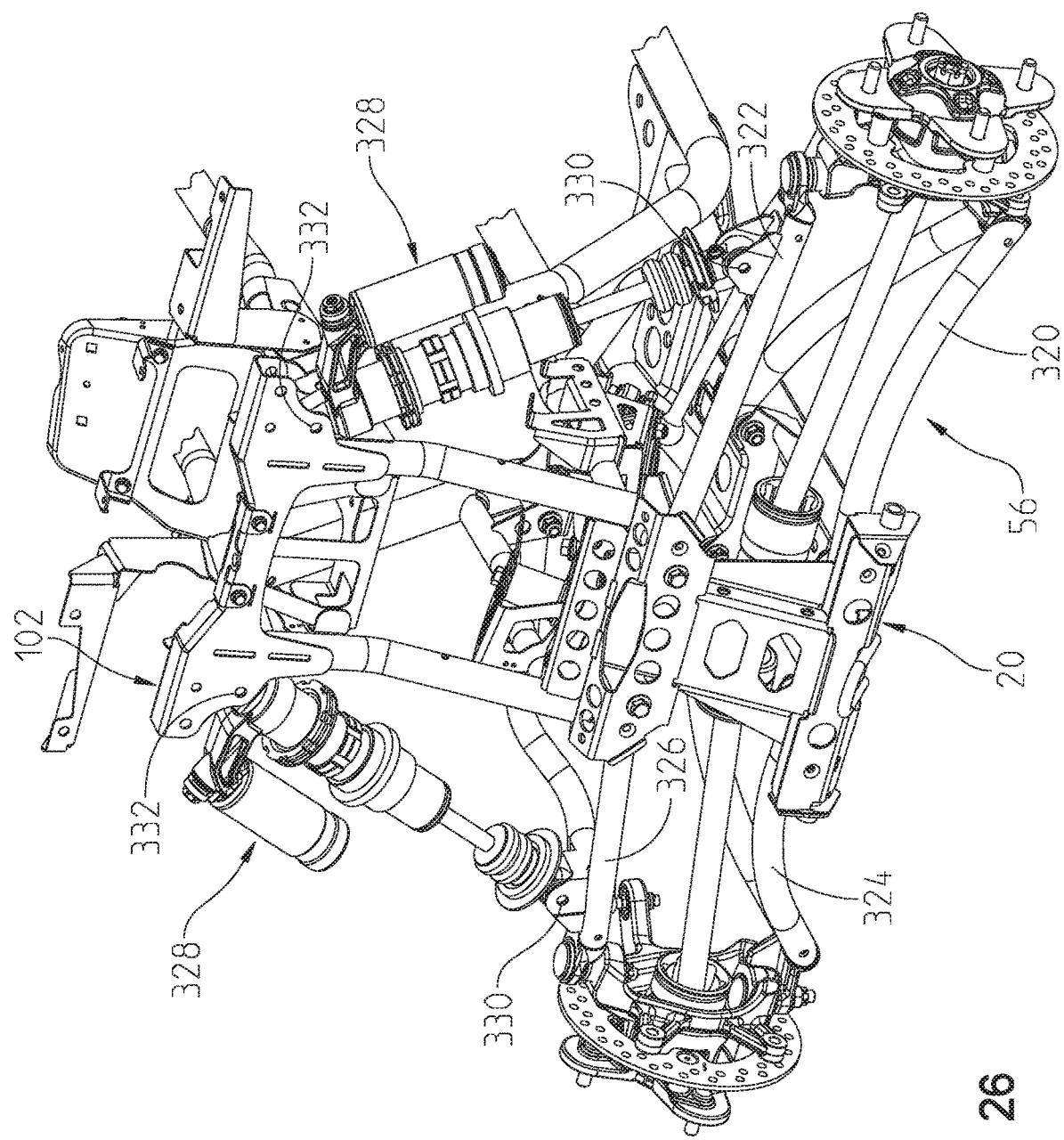
FIG. 26 shows a front left perspective view of the 48 inch wide ATV with the body removed.

As shown in FIG. 26, front suspension 56 includes a lower left A-arm 320, upper left A-arm 322, lower right A-arm 324 and upper right A-arm 326. Shock absorbers 328 couple between each of the upper A-arms 322, 326 and shock tower 102, respectively. More particularly, the A-arms 322 and 326 each have a coupling 330 for coupling a lower end of shocks 328 and shock tower 102 has two coupling points 332 for coupling to upper ends of shocks 328. Multiple apertures may be provided in lieu of coupling point 332 for varying the dampening characteristics of the shocks.

Figure 27:
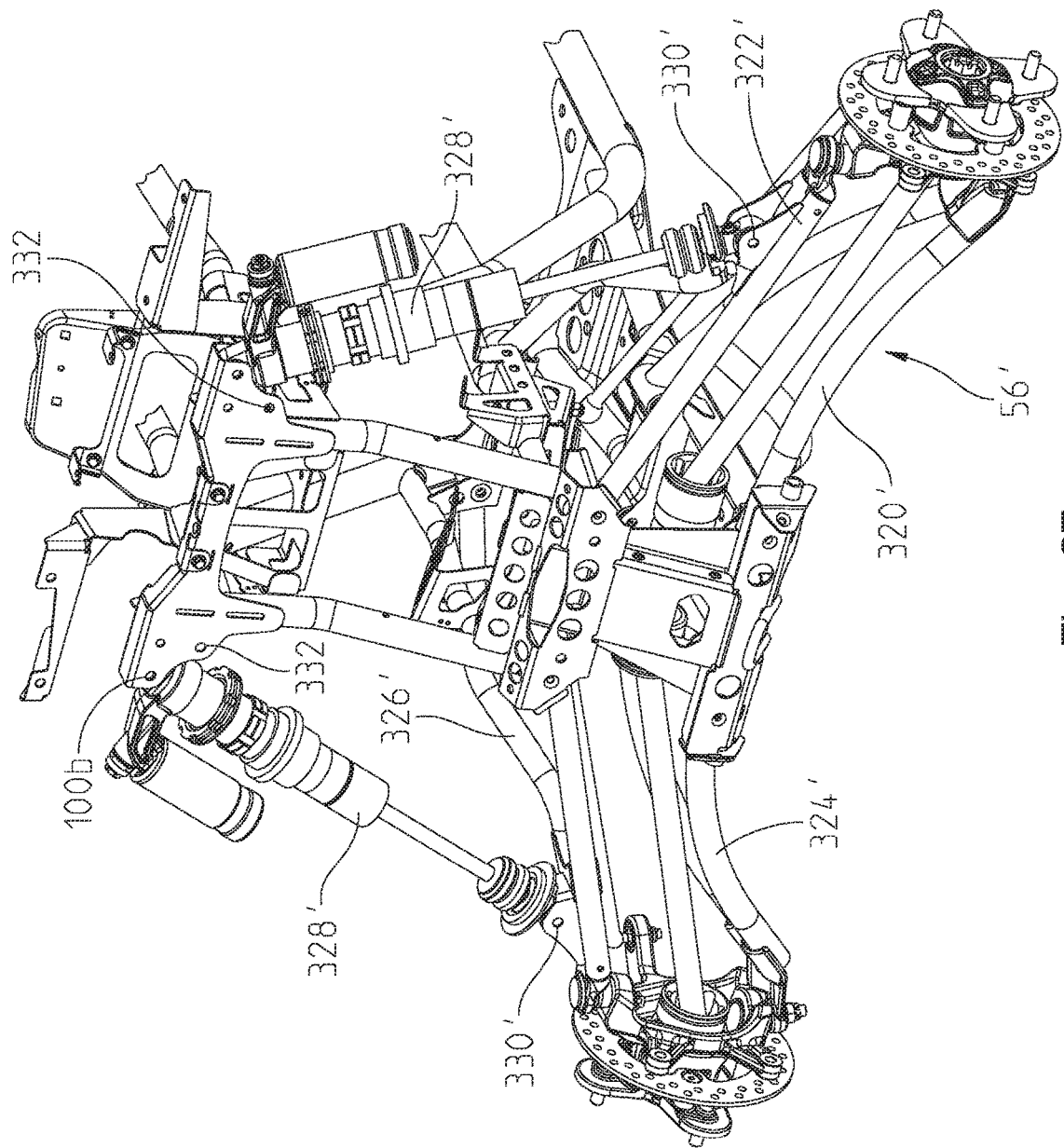
FIG. 27 shows a front left perspective view of the 55 inch wide ATV with the body removed.

For example, the ATV shown in FIG. 26 has a 48 inch width and the vehicle shown in FIG. 27 has a 54 inch width, while utilizing the same frame 20. However, front suspension 56' includes a lower left A-arm 320', upper left A-arm 322', lower right A-arm 324' and upper right A-arm 326'. Shock absorbers 328' couple between each of the upper A-arms 322', 326' and shock tower 102, respectively. More particularly, the A-arms 322' and 326' each have a coupling 330' for coupling a lower end of shocks 328. However, upper ends of shocks 328 are alternatively coupled to coupling points 100b in the FIG. 27 embodiment, as opposed to the coupling point 332 as shown in the FIG. 26 embodiment.

Figure 28:
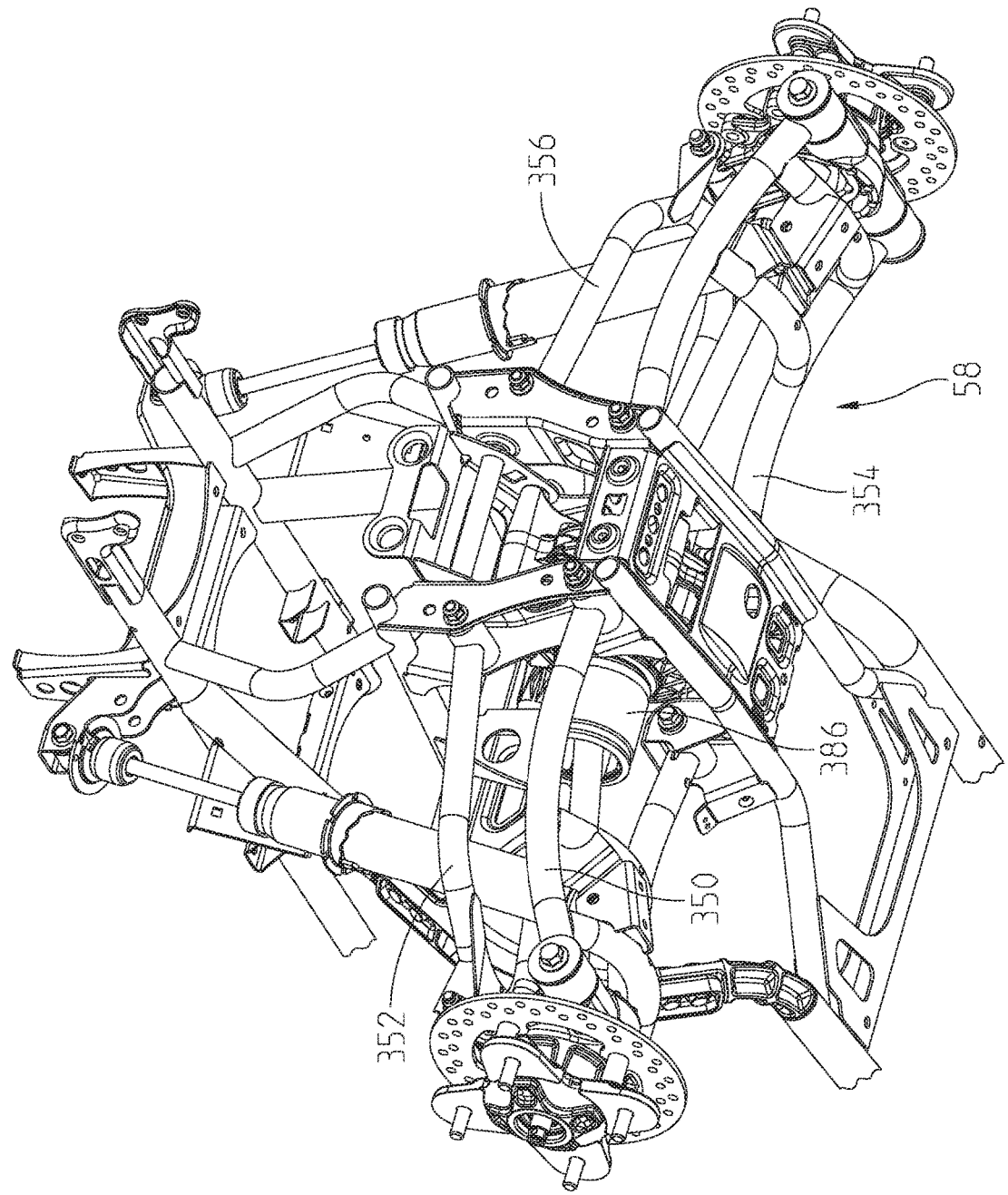
FIG. 28 shows an underside perspective view of the 48 inch wide ATV with the body removed.
Figure 29:
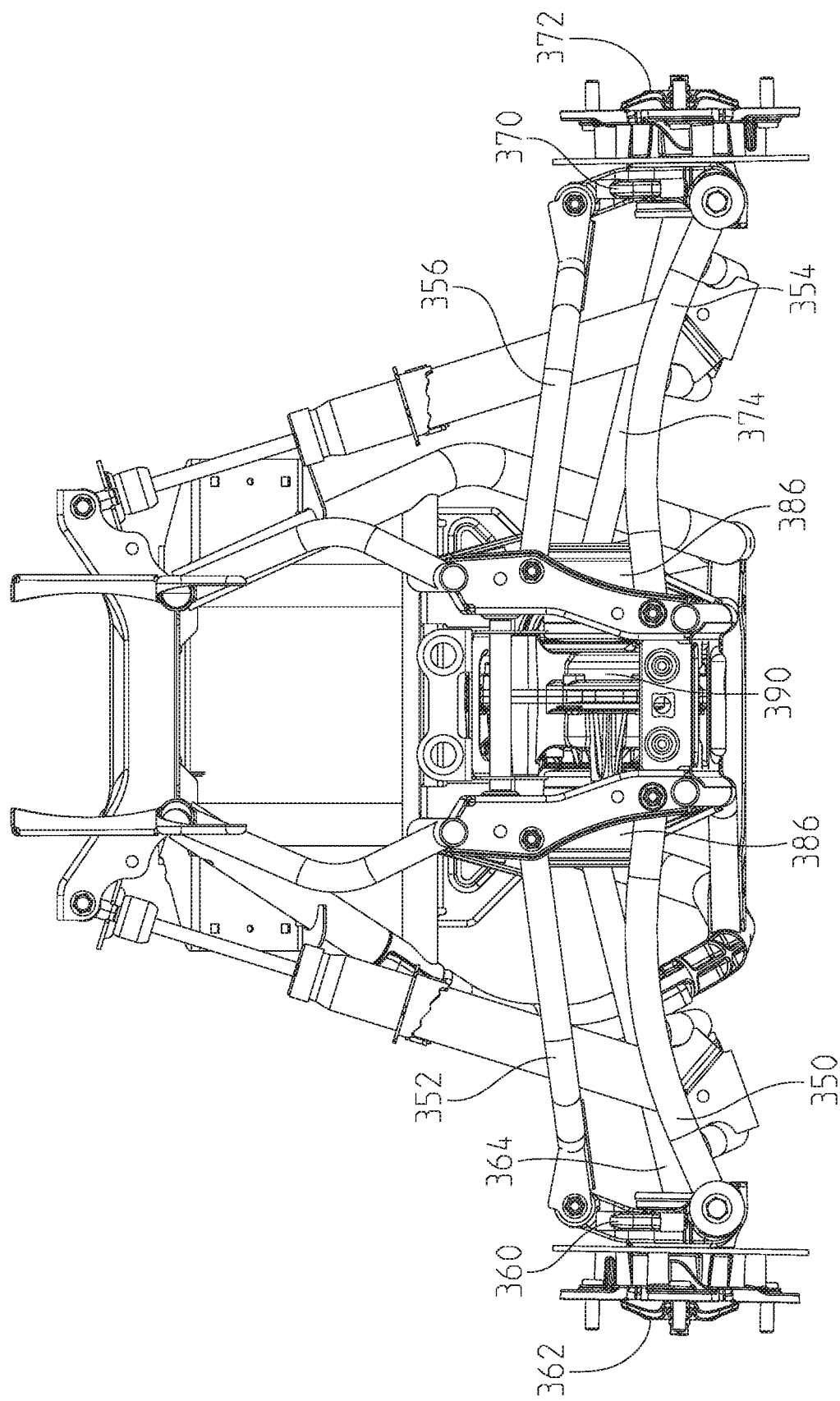
FIG. 29 shows a rear view of the 48 inch rear suspension.
Figure 30:
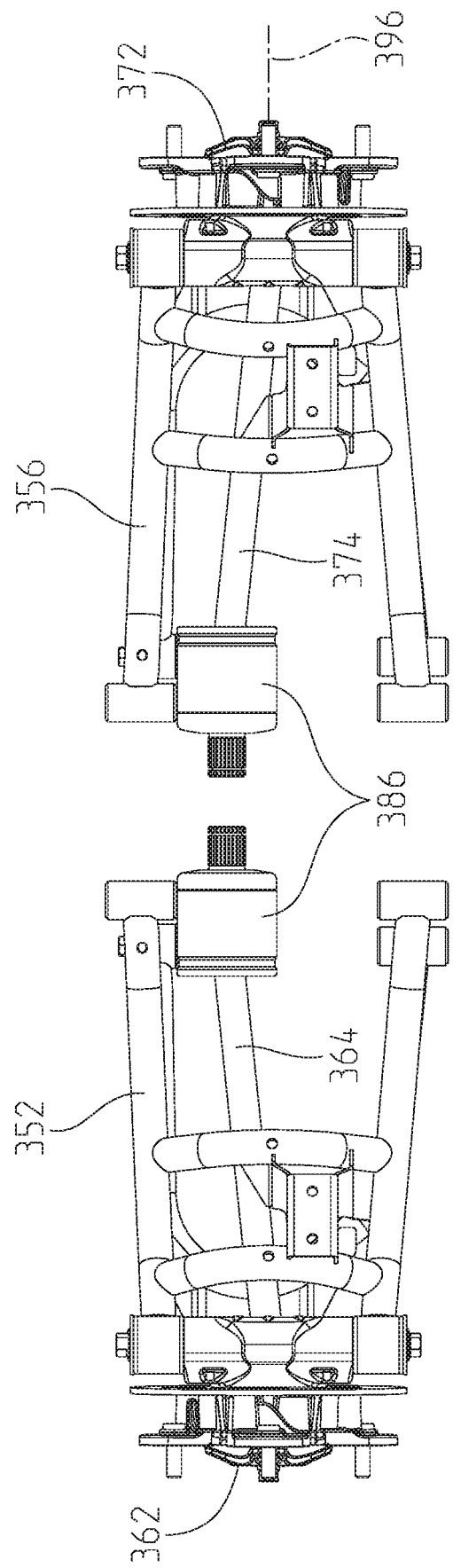
FIG. 30 shows a top view of the suspension of FIG. 29.

With reference now to FIGS. 28-33, the rear suspension 58 of the ATV 2 will be described. With reference first to FIGS. 28-30, the suspension of the 48" vehicle will be described. As shown, the suspension 58 is comprised of a left lower A-arm 350, a left upper A-arm 352, a lower right A-arm 354 and a right upper A-arm 356. The left A-arms 350, 352 are coupled to a knuckle 360 (FIG. 29) which retains a left rear wheel hub 362. Wheel hub 362 is driven by a rear left half shaft 364. The right A-arms 354 and 356 are coupled to a right rear knuckle 370 and a right rear wheel hub 372 where wheel hub 372 is driven by a right rear half shaft 374. As shown, half shafts 364, 374 are driven by couplings 386 of a final drive 390. As shown best is FIG. 30, the axial centerline 396 through the wheel hubs on the present vehicle is moved rearwardly relative to the rear wheels of the vehicle shown and described in U.S. patent application Ser. No. 15/895,495, filed Feb. 13, 2018, the subject matter of which is disclosed herein by reference. In that same regard, the half shafts 364, 374 also sweep rearwardly.

Figure 31:
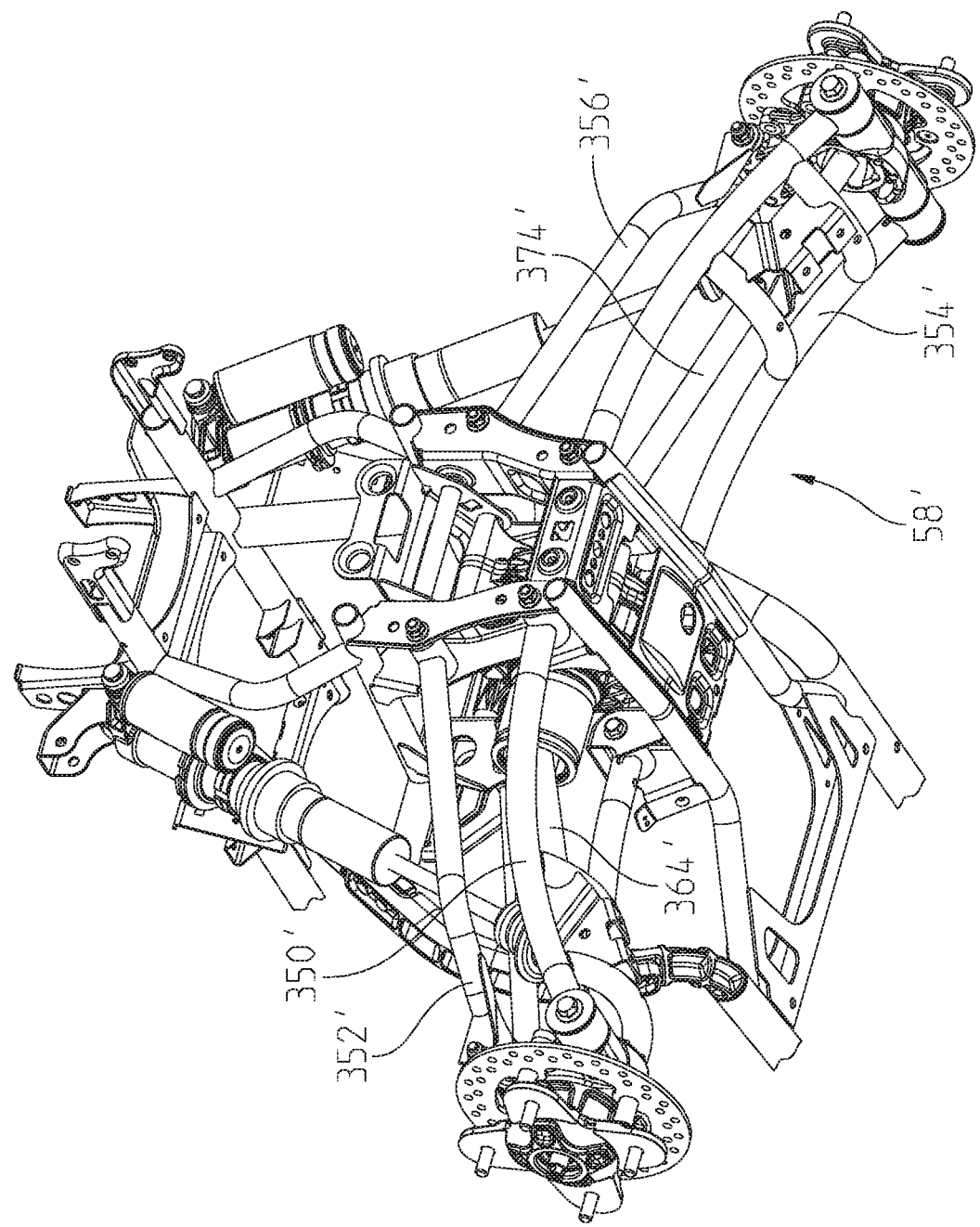
FIG. 31 shows an underside perspective view of the 55 inch wide ATV with the body removed.
Figure 32:
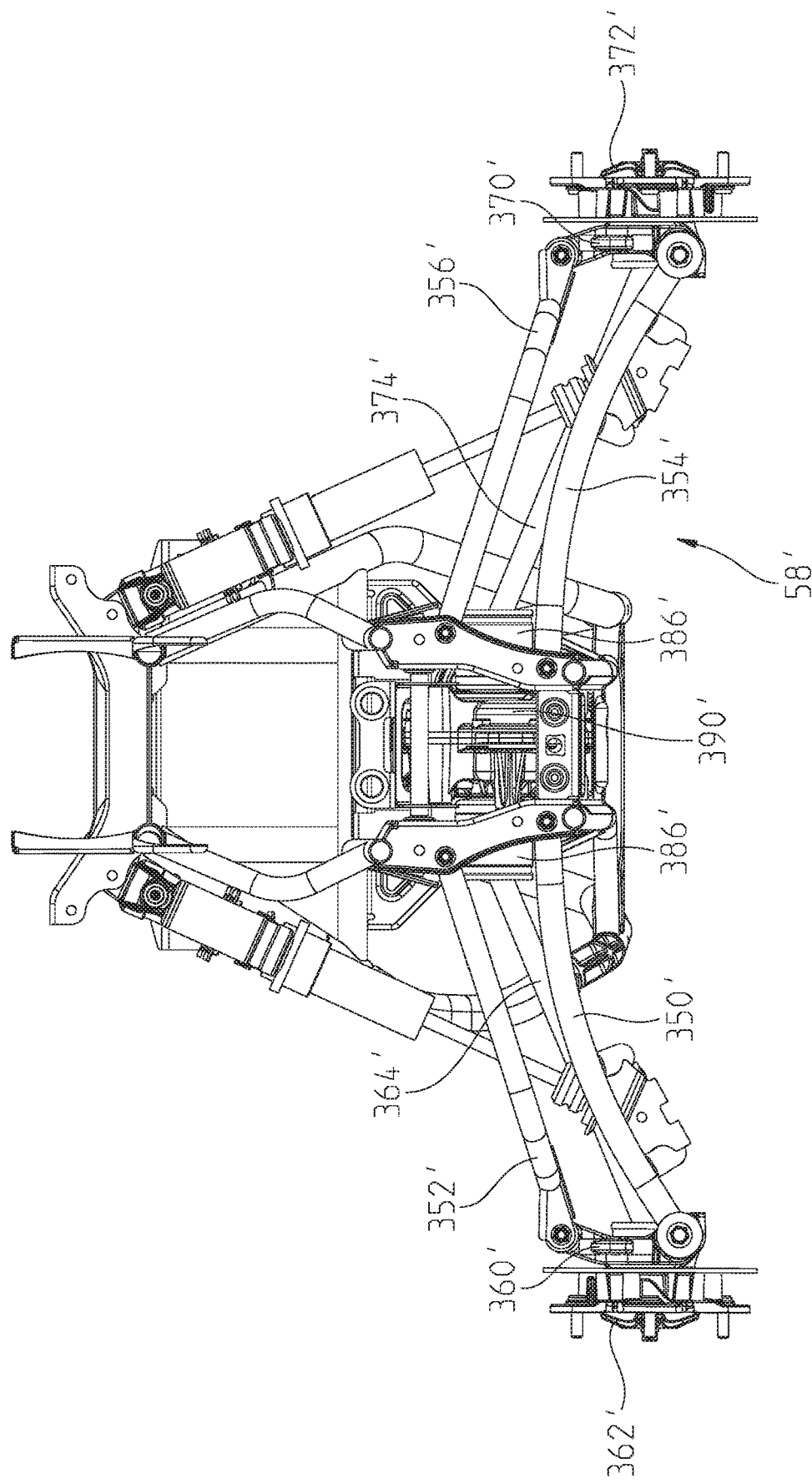
FIG. 32 shows a rear view of the 55 inch rear suspension.
Figure 33:
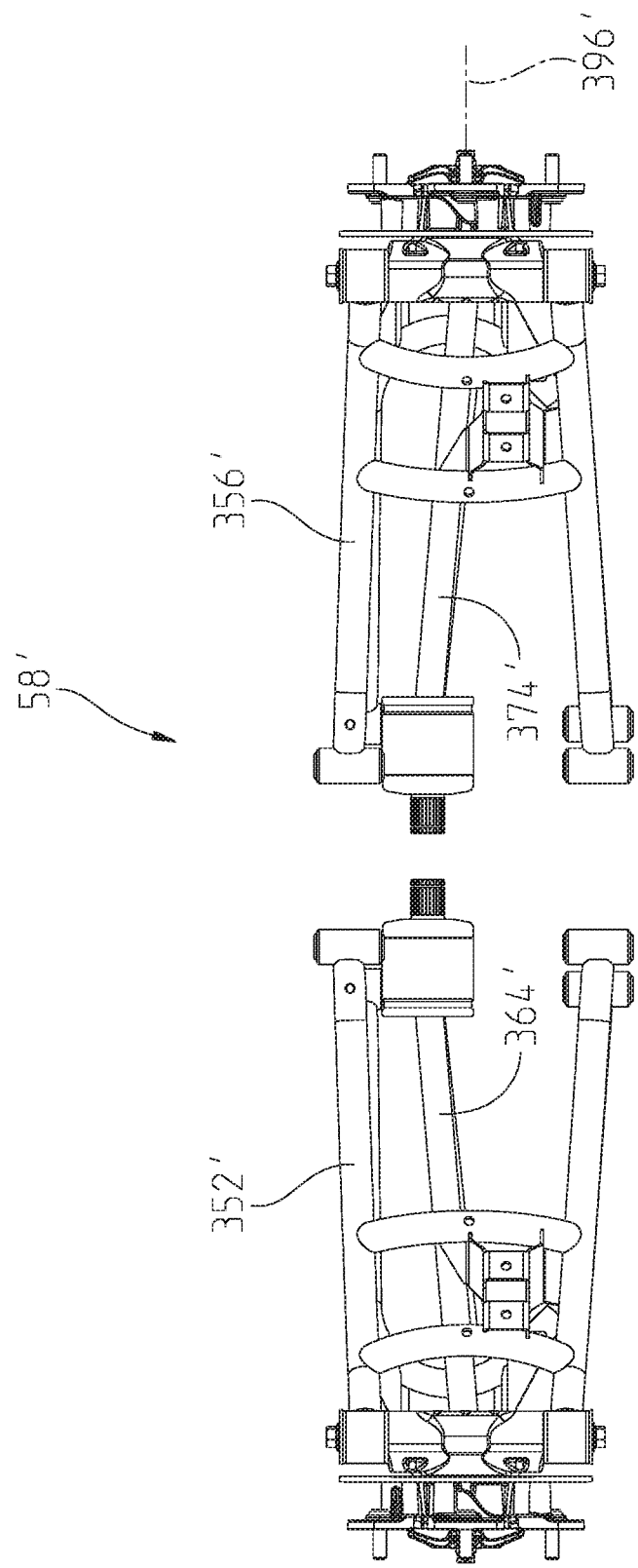
FIG. 33 shows a top view of the suspension of FIG. 32.

With reference now to FIGS. 31-33, the rear suspension 58' for the 55" vehicle will be described. As with the front suspension, the majority of the components of the vehicle remain the same, but the left A-arms 350', 352' and half shaft 364' are replaced to compensate for the increased vehicle width. Similarly, the right-hand side suspension is also changed with lower A-arm 354', upper A-arm 356' and half shaft 374' having the increased dimensions like the left-hand side. The left A-arms 350', 352' are coupled to a knuckle 360' which retains a left rear wheel hub 362'. Wheel hub 362' is driven by rear left half shaft 364'. The right A-arms 354' and 356' are coupled to a right rear knuckle 370' and a right rear wheel hub 372' where wheel hub 372' is driven by right rear half shaft 374'. As shown, half shafts 364', 374' are driven by couplings 386' of a final drive 390'. As shown best is FIG. 33, the axial centerline 396' through the wheel hubs on the present vehicle is moved rearwardly relative to the rear wheels of the vehicle shown and described in U.S. patent application Ser. No. 15/895,495, filed Feb. 13, 2018, the subject matter of which is disclosed herein by reference. In that same regard, the half shafts 364', 374' also sweep rearwardly.

Finally, and with respect again to FIG. 9, a battery compartment 400 is provided directly behind the shock tower 102, which the battery high in the vehicle preventing the battery from being submersed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An all-terrain vehicle (ATV), comprising:
a frame comprised of a main frame portion and a front frame subassembly, wherein the front frame subassembly comprises substantially vertical members and rearwardly extending members;
ground engaging members supporting the frame, including front and rear ground engaging members;
a steering input mechanism;
a radiator coupled to the frame forward of the steering input mechanism; and
a hood rotatably coupled to the frame and having an open position providing access to the radiator and a closed position enclosing the radiator;
a winch coupled to a rear side of the substantially vertical members; and
an air intake assembly supported by the frame, and a first portion of the hood is positioned adjacent the radiator and a second portion of the hood is positioned adjacent the air intake assembly, and the second portion of the hood is at a vertical position greater than the first portion of the hood relative to a ground surface.

2. The ATV of claim 1, wherein the steering input mechanism comprises handle bars.

3. The ATV of claim 1, wherein the radiator is positioned at an angle relative to a horizontal axis.

4. The ATV of claim 3, wherein the radiator is positioned at an angle of less than 45 degrees relative to a horizontal axis.

5. The ATV of claim 4, wherein the radiator is positioned within a range of 30-40 degrees relative to a horizontal axis.

6. The ATV of claim 5, wherein the radiator is positioned at an angle of approximately 35 degrees relative to a horizontal axis.

7. The ATV of claim 1, wherein the hood is coupled about a front of the vehicle frame, whereby the hood rotates towards a front of the vehicle.

8. The ATV of claim 1, wherein the radiator is coupled to the rearwardly extending members of the front frame subassembly.

9. The ATV of claim 1, wherein the hood is coupled to the front frame subassembly forward of the radiator.

10. The ATV of claim 1, wherein the hood comprises an integrated grill having air vents therethrough for directing air onto the radiator for cooling purposes.

11. The ATV of claim 10, wherein a first set of vents is directed at an angle substantially transverse to a front face of the radiator.

12. The ATV of claim 11, wherein a second set of vents is directed at an angle substantially parallel to a front face of the radiator.

13. The ATV of claim 1, further comprising a brush guard coupled to a front side of the substantially vertical members, wherein the substantially vertical are positioned longitudinally intermediate the brush guard and the winch.

14. The ATV of claim 1, further comprising footwells mounted rearward of the front frame subassembly.

15. The ATV of claim 1, further comprising a cargo area, and wherein the air intake assembly is at a vertical position greater than a vertical position of the cargo area relative to a ground surface.

16. An all-terrain vehicle (ATV), comprising:
a frame comprised of a main frame portion and a front frame subassembly, wherein the front frame subassembly comprises substantially vertical members and rearwardly extending members;
ground engaging members supporting the frame, including front and rear ground engaging members;
an operator area comprising a steering input mechanism, a seat, and footwells;
an engine supported by the frame and positioned within an envelope of the operator area;
a radiator coupled to an upper surface of the rearwardly extending members and generally parallel to the rearwardly extending members of the front frame subassembly;
a winch coupled to the substantially vertical members of the front frame subassembly, and the winch positioned forward of the radiator; and
an airbox positioned longitudinally intermediate the engine and the radiator and laterally intermediate the front ground engaging members.

17. The ATV of claim 16, further comprising a hood rotatably coupled to the frame and having an open position providing access to the radiator and a closed position enclosing the radiator.

18. The ATV of claim 17, wherein the radiator is positioned at an angle relative to a horizontal axis.

19. The ATV of claim 18, wherein the radiator is positioned at an angle of less than 45 degrees relative to a horizontal axis.

20. The ATV of claim 17, wherein the hood is coupled about a front of the vehicle frame, whereby the hood rotates towards a front of the vehicle.

21. The ATV of claim 17, wherein the hood comprises an integrated grill having air vents therethrough for directing air onto the radiator for cooling purposes.

22. The ATV of claim 21, wherein the grill includes a first set of vents is directed at an angle substantially transverse to a front face of the radiator.

23. The ATV of claim 22, wherein the grill includes a second set of vents is directed at an angle substantially parallel to a front face of the radiator.

24. The ATV of claim 16, wherein the winch is coupled to a rear side of the substantially vertical members.

25. The ATV of claim 16, wherein the hood is coupled to the front frame subassembly forward of the radiator.

26. The ATV of claim 16, further comprising a seat supported by the frame, and the airbox is longitudinally aligned with the seat.

27. The ATV of claim 16, wherein the airbox is longitudinally aligned with the steering input mechanism.

28. The ATV of claim 27, wherein the steering input mechanism is comprised of laterally extending handlebars.

29. The ATV of claim 16, wherein the airbox comprises at least one duct fluidly coupled to the engine.

* * * * *